United States Patent
Abe

(10) Patent No.: US 10,088,944 B2
(45) Date of Patent: Oct. 2, 2018

(54) DISPLAY DEVICE

(71) Applicant: Japan Display Inc., Minato-ku (JP)

(72) Inventor: Hiroyuki Abe, Tokyo (JP)

(73) Assignee: Japan Display Inc., Minato-ku (JP)

( * ) Notice: Subject to any disclaimer, the term of this patent is extended or adjusted under 35 U.S.C. 154(b) by 130 days.

(21) Appl. No.: 15/193,708

(22) Filed: Jun. 27, 2016

(65) Prior Publication Data

US 2017/0003807 A1    Jan. 5, 2017

(30) Foreign Application Priority Data

Jul. 1, 2015  (JP) .................................. 2015-132658

(51) Int. Cl.
G06F 3/041 (2006.01)
G06F 3/044 (2006.01)
G09G 5/00 (2006.01)

(52) U.S. Cl.
CPC ............ G06F 3/0416 (2013.01); G06F 3/044 (2013.01); G06F 3/0412 (2013.01); G09G 5/00 (2013.01)

(58) Field of Classification Search
CPC ....... G06F 3/044; G06F 3/0412; G06F 3/0416
See application file for complete search history.

(56) References Cited

U.S. PATENT DOCUMENTS

| | | | |
|---|---|---|---|
| 5,410,329 A * | 4/1995 | Tagawa | G06F 3/0412 345/104 |
| 2011/0169788 A1 | 7/2011 | Abe et al. | |
| 2012/0262387 A1 * | 10/2012 | Mizuhashi | G06F 3/0412 345/173 |
| 2012/0306844 A1 | 12/2012 | Abe et al. | |
| 2013/0088483 A1 | 4/2013 | Abe et al. | |
| 2014/0152644 A1 | 6/2014 | Abe et al. | |
| 2014/0292700 A1 | 10/2014 | Mizuhashi et al. | |
| 2014/0375606 A1 | 12/2014 | Abe et al. | |
| 2015/0084920 A1 | 3/2015 | Abe et al. | |

(Continued)

FOREIGN PATENT DOCUMENTS

| | | |
|---|---|---|
| JP | 2011-145474 | 7/2011 |
| JP | 2012-221485 | 11/2012 |

(Continued)

*Primary Examiner* — Nelson Rosario
*Assistant Examiner* — Scott Au
(74) *Attorney, Agent, or Firm* — Oblon, McClelland, Maier & Neustadt, L.L.P.

(57) ABSTRACT

According to one embodiment, a display device includes common electrodes, detection electrodes, a common-electrode drive circuit including shift registers and switch circuits electrically connected to the shift registers, and a driver which outputs four-phase clock signals and a touch-drive signal, wherein a reset operation of the each shift register is controlled by predetermined two of the four-phase clock signals, each of the switch circuits connects a signal line from the driver to common electrodes based on a shift signal output from an associated shift register, and the each switch circuit causes the touch-drive signal from the driver to be supplied to the common electrodes of the block during a period from time at which the shift signal is output from the associated shift register to time at which a predetermined one of the four-phase clock signals is input.

17 Claims, 13 Drawing Sheets

(56) References Cited

U.S. PATENT DOCUMENTS

| | | | |
|---|---|---|---|
| 2015/0242041 A1* | 8/2015 | Sugita | G06F 3/044 345/174 |
| 2015/0355767 A1 | 12/2015 | Abe et al. | |
| 2015/0370381 A1 | 12/2015 | Mizuhashi et al. | |

FOREIGN PATENT DOCUMENTS

| JP | 2012-230657 | 11/2012 |
|---|---|---|
| JP | 2012-252108 | 12/2012 |
| JP | 2013-83678 | 5/2013 |
| JP | 2014-112166 | 6/2014 |
| JP | 2015-7925 | 1/2015 |
| JP | 2015-60186 | 3/2015 |
| JP | 2015-232601 | 12/2015 |
| JP | 2015-232602 | 12/2015 |

* cited by examiner

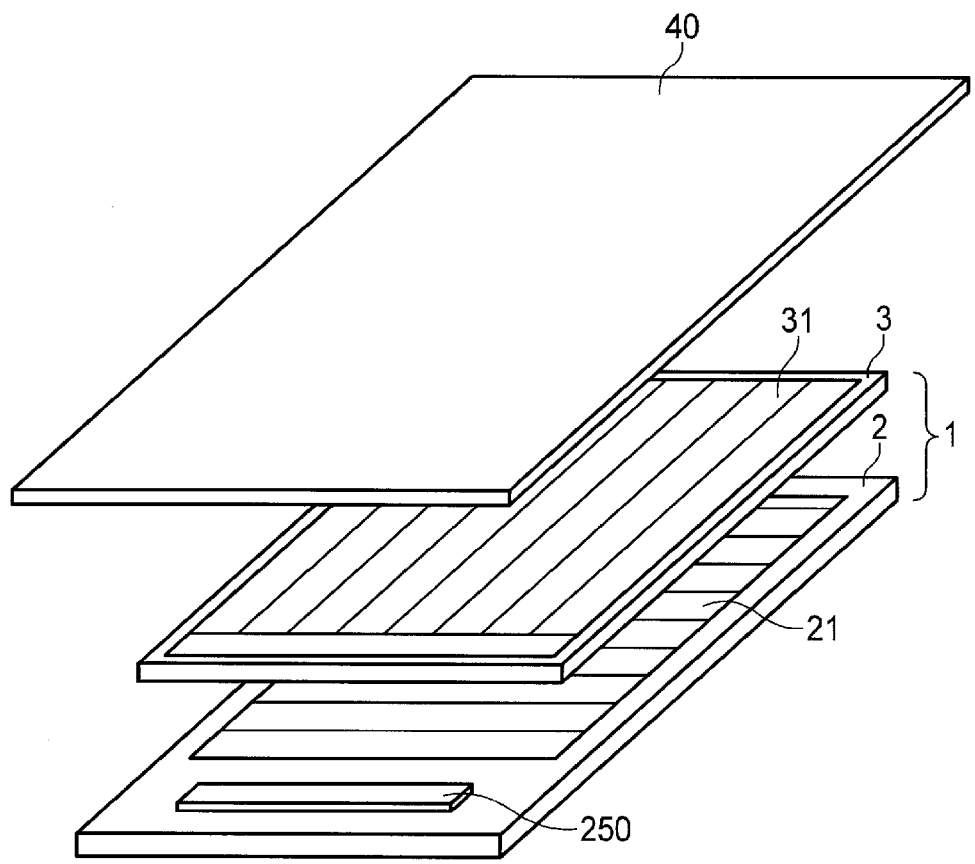
F I G. 1

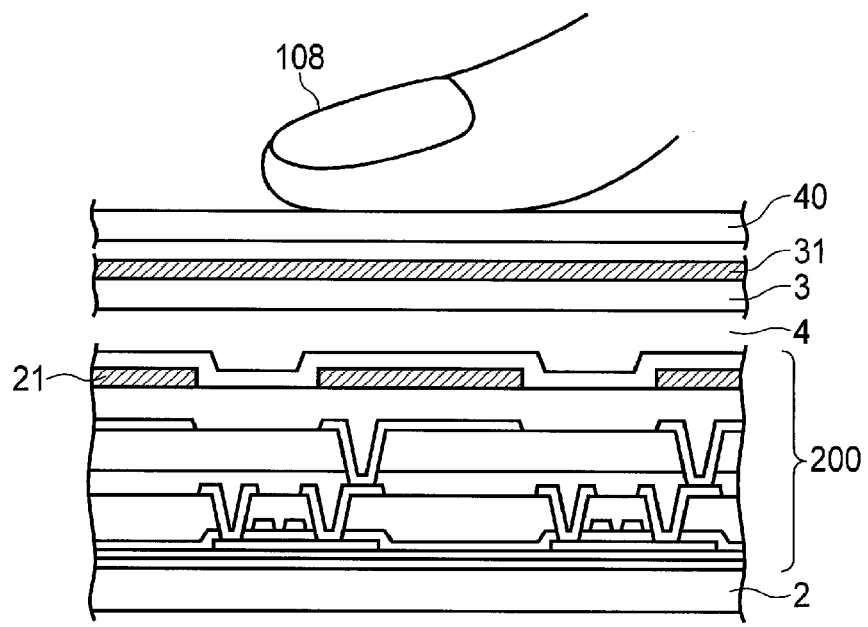
F I G. 2
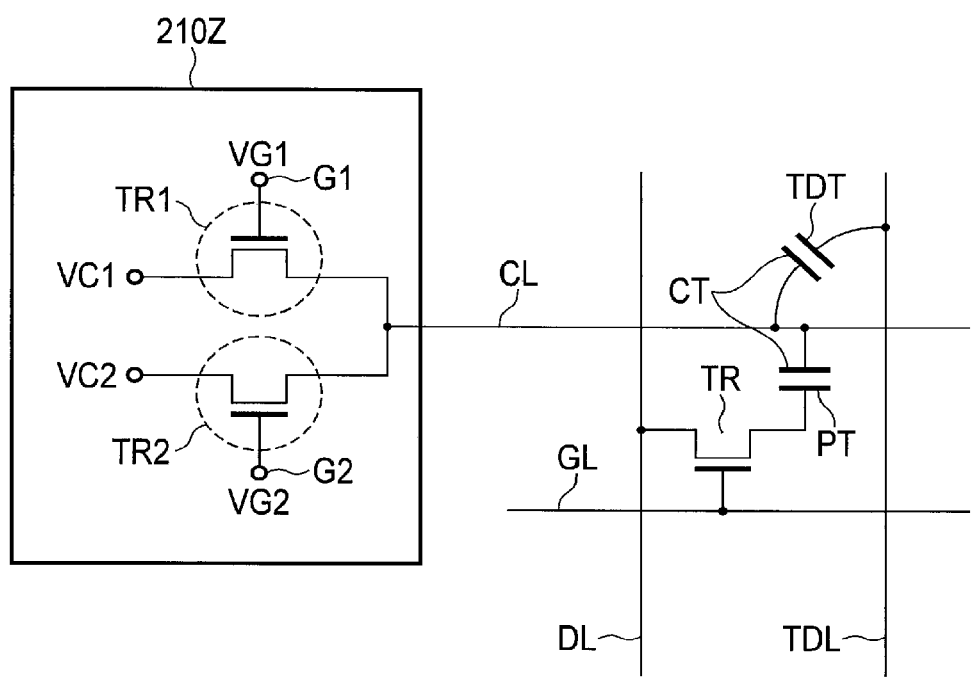
F I G. 3

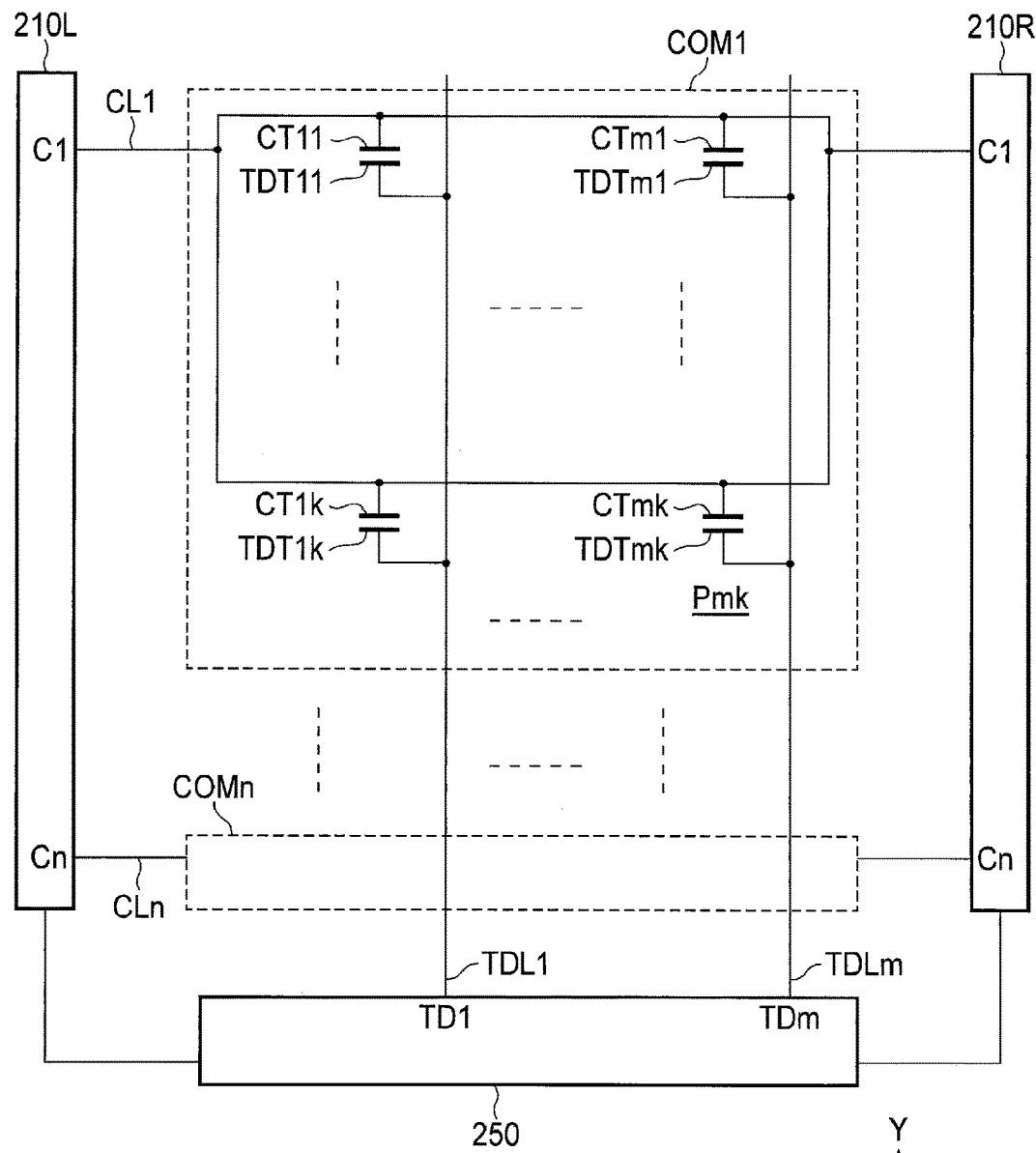
F I G. 6

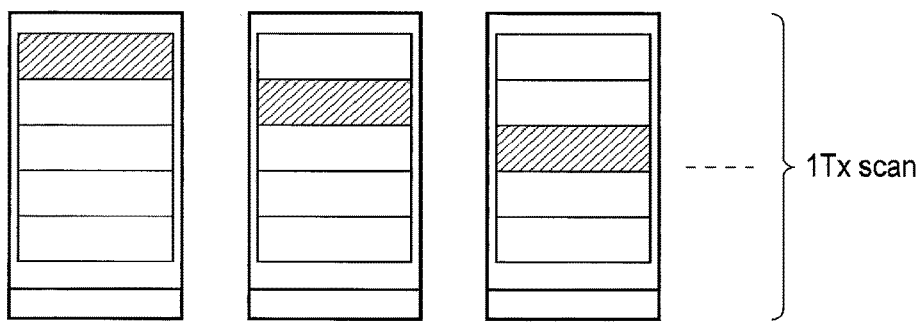
FIG. 7A — 1Tx scan
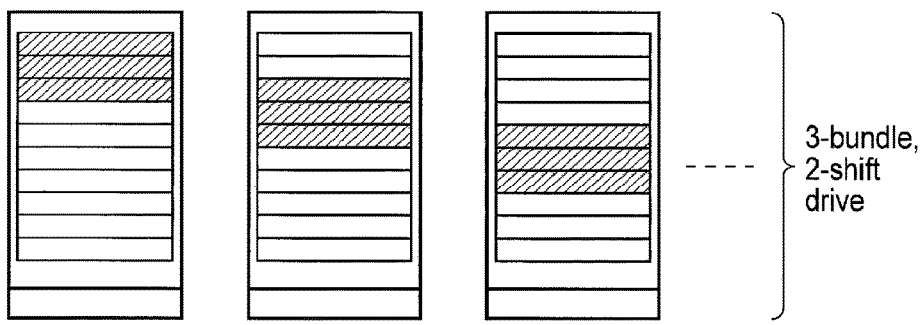
FIG. 7B — 3-bundle, 2-shift drive
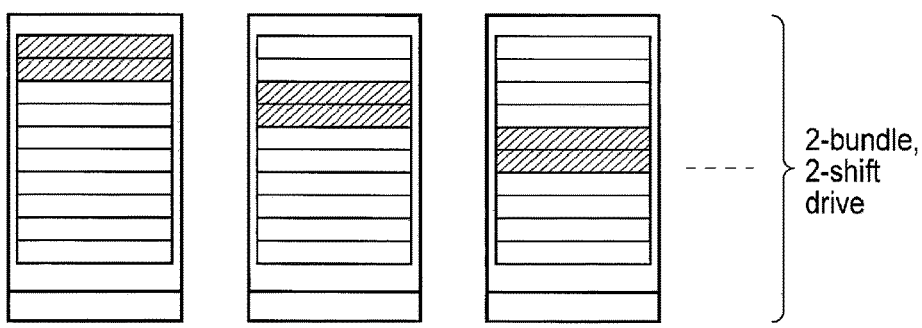
FIG. 7C — 2-bundle, 2-shift drive

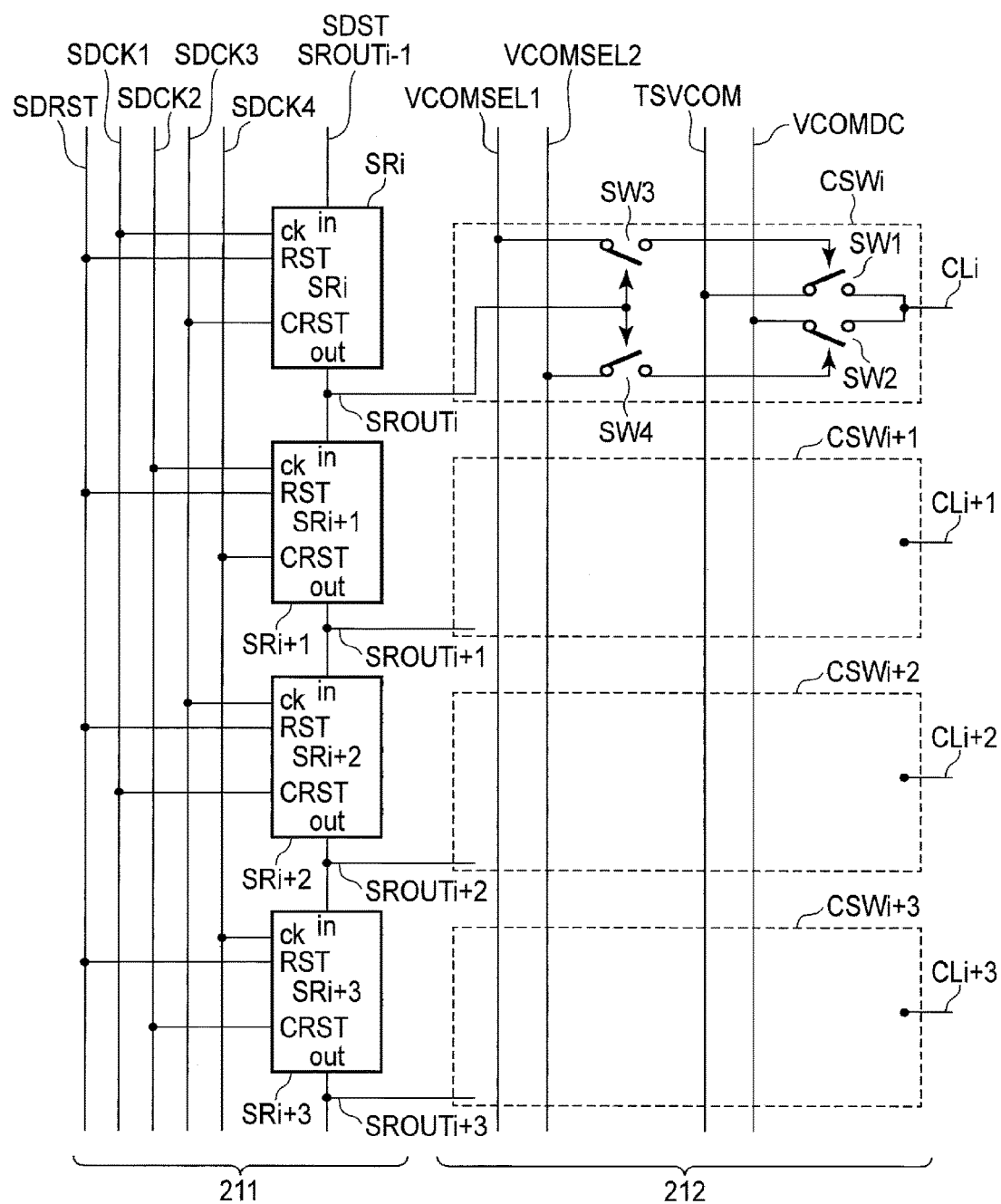
F I G. 8

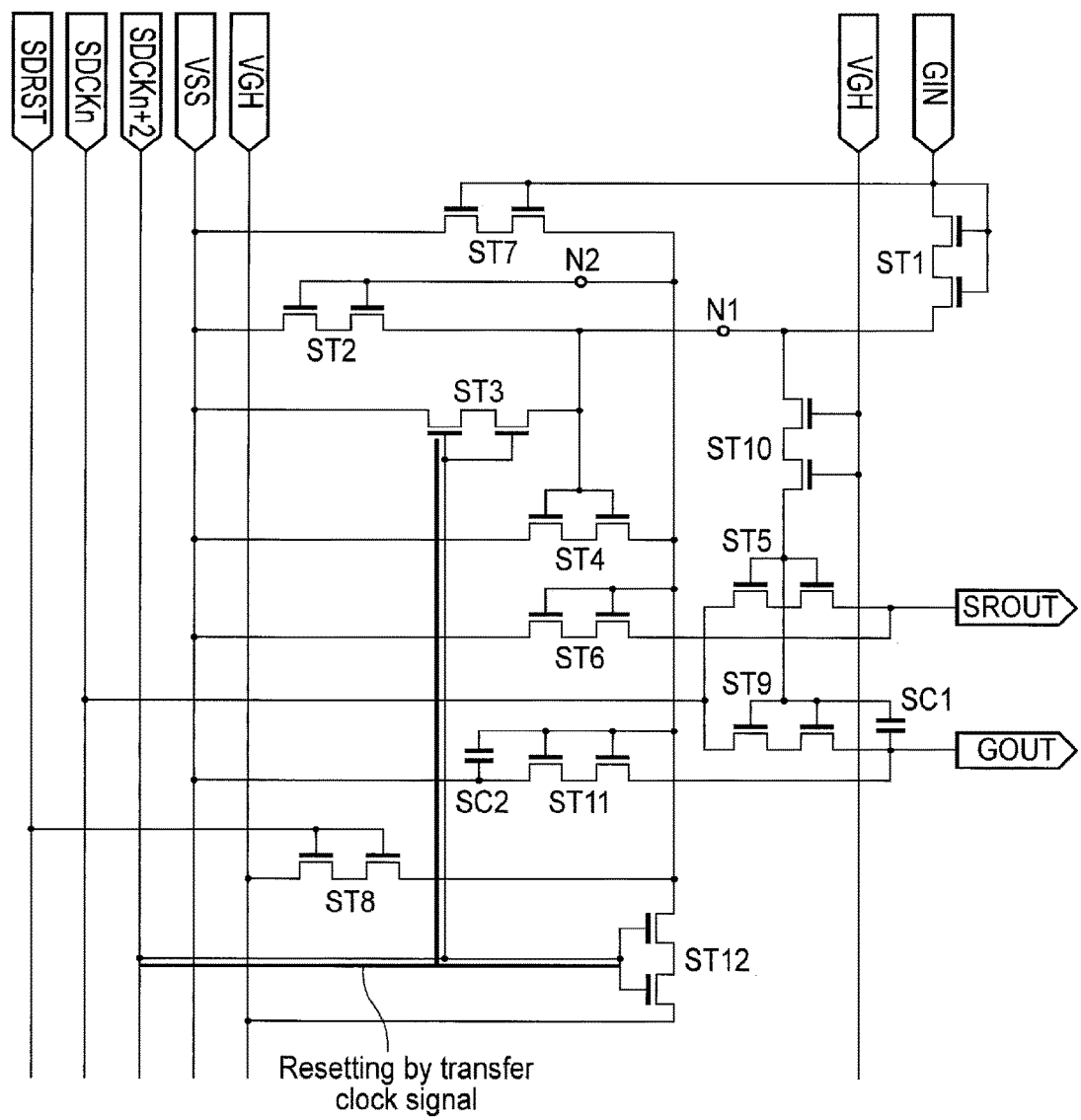
F I G. 11

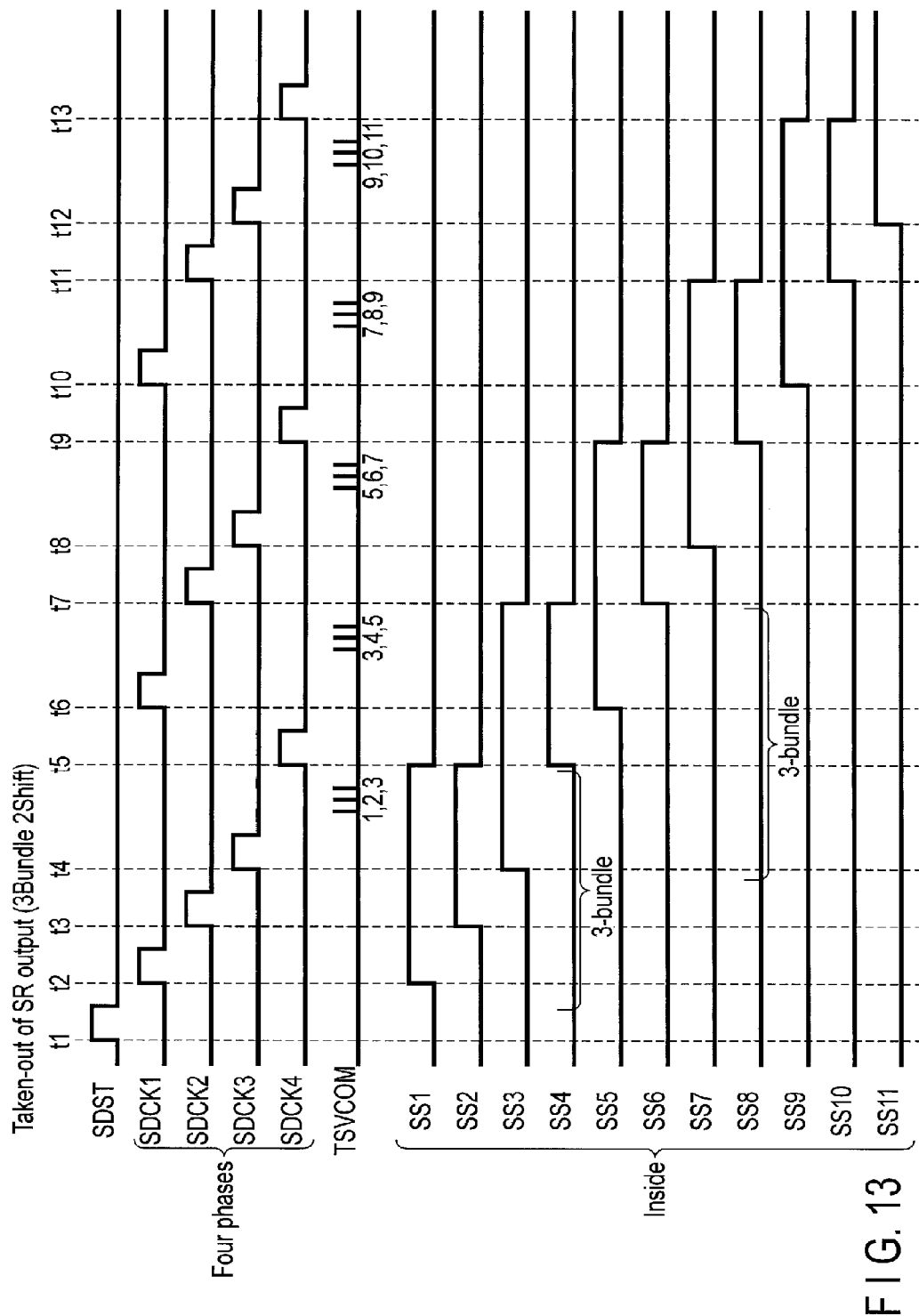
F I G. 13

DISPLAY DEVICE

CROSS-REFERENCE TO RELATED APPLICATIONS

This application is based upon and claims the benefit of priority from Japanese Patent Application No. 2015-132658, filed Jul. 1, 2015, the entire contents of which are incorporated herein by reference.

FIELD

Embodiments described herein relate generally to a display device.

BACKGROUND

In recent years, attention has been given to the following type of display devices having a touch detection function: a touch detection device referred to as a so-called touchpanel is provided on a display device such as a liquid crystal display device; or a touchpanel and a display device are integrated as a single body. Such display devices having a touch detection function are made to display various button images to enable data to be input without physical buttons. Also, such display devices do not need input devices such as a keyboard, a mouse and a keypad, and thus tend to be broadly used as display devices of computers, portable information devices such as cell phones, etc.

As such a touchpanel, a capacitive touchpanel is known in which electrodes formed to extend in a single direction are arranged in such a way as to intersect other electrodes formed to extend in another direction. In this touchpanel, the electrodes are connected to a control circuit, and are supplied with an excitation current from the control circuit, to thereby detect an object located in proximity to them.

As a display device having a touch detection function, an in-cell touchpanel is proposed in addition to an on-cell touchpanel in which a touchpanel is provided on a display surface of a display device. In the in-cell display device, common electrodes for display, which are originally provided in the display device, are also used as one of a pair of groups of electrodes for a touch sensor, and the other group of electrodes (touch detection electrodes) are provided to intersect the common electrodes.

Incidentally, in a conventional in-cell display device, in a touch-drive operation, a plurality of common electrodes for display are scan-driven one by one. Thus, in order to achieve a bundled drive in which in a touch-drive operation, a number of common electrodes are bundled and scan-driven, the display device needs to be greatly modified.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary schematic view showing a basic structure of the display device according to the embodiment.

FIG. 2 is an enlarged exemplary cross-sectional view schematically showing part of the liquid crystal display panel in the display device according to the embodiment.

FIG. 3 is an exemplary view schematically showing connections between electrodes and a drive circuit in the display device according to the embodiment.

FIG. 6 is an exemplary configuration view of a region related to touch detection of the display device according to the embodiment.

FIG. 7A is an exemplary view for illustrating a bundled touch-drive method of the display device according to the embodiment.

FIG. 7B is an exemplary view for illustrating another bundled touch-drive method of the display device according to the embodiment.

FIG. 7C is an exemplary view for illustrating still another bundled touch-drive method of the display device according to the embodiment.

FIG. 8 is an exemplary block diagram of a Tx circuit according to the embodiment.

FIG. 11 is an exemplary circuit diagram showing an example of a shift register in the display device according to the embodiment.

FIG. 13 is an exemplary view for illustrating a drive method in which in the display device according to the embodiment, common electrodes are successively bundled and driven such that three common electrodes at a time are bundled for driving, and the common electrodes to be bundled are shifted by two common electrodes at a time.

DETAILED DESCRIPTION

Figure 4:
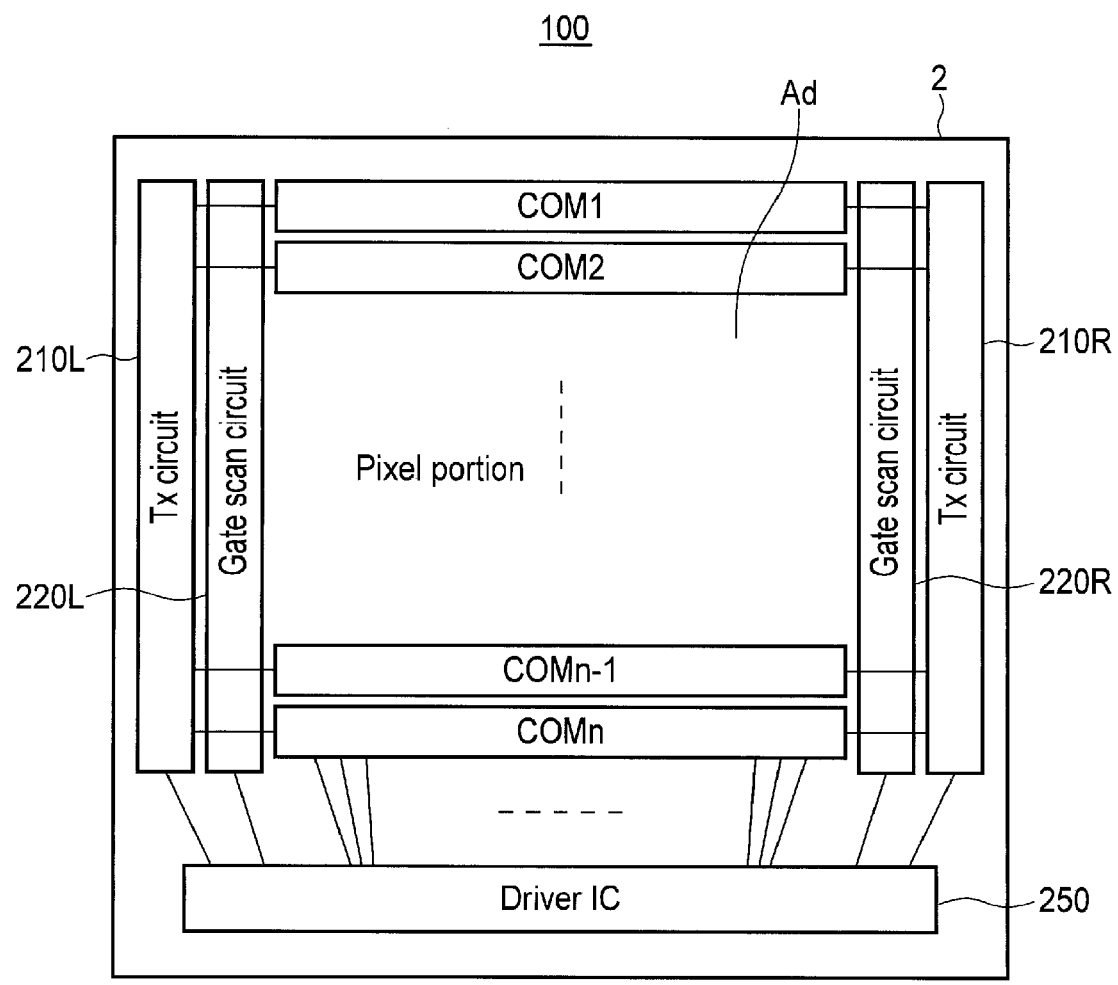
FIG. 4 is an exemplary view schematically showing how elements are mounted on the display device according to the embodiment.

Various embodiments will be described hereinafter with reference to the accompanying drawings.

In general, according to one embodiment, a display device includes a plurality of common electrodes extending in a first direction and arranged in parallel with each other; a plurality of detection electrodes extending in a second direction crossing the first direction and arranged in parallel with each other; a common-electrode drive circuit including a plurality of shift registers connected in series to each other and a plurality of switch circuits electrically connected to the shift registers, respectively; and a driver which outputs four-phase clock signals and a touch-drive signal to control the common-electrode drive circuit, wherein each of the shift registers is configured to transfer a shift signal, and a reset operation of the each shift register is controlled by predetermined two of the four-phase clock signals, each of the switch circuits connects a signal line from the driver to a common electrode or electrodes of an associated block based on a shift signal output from an associated shift register, and the each switch circuit causes the touch-drive signal from the driver to be supplied to the common electrode or electrodes of the block during a period from time at which the shift signal is output from the associated shift register to time at which a predetermined one of the four-phase clock signals is input.

Embodiments will be described with reference to the accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc. of each portion as compared with an actual aspect, but they are mere examples and do not restrict the interpretation of the invention. In the present specification and drawings, after an element or elements are each explained once with reference to a figure in the drawings, elements identical to the explained elements will be denoted by the same reference numbers, respectively, and their explanations will be omitted as appropriate.

It should be noted that a liquid crystal display device will be explained as an example of a display device according to an embodiment. However, the display device of the present invention is not limited to the liquid crystal display device. The embodiment is applied to another type of display device such as an organic electroluminescent display (EL) device.

FIG. 1 is an exemplary schematic view showing a basic structure of the display device according to the embodiment. As shown in FIG. 1, a display device 100 comprises a liquid crystal display panel 1 and a front panel 40.

The liquid crystal display panel 1 is formed in the following manner. A TFT substrate 2 and a color filter substrate 3 are combined together, with a predetermined gap provided between them. To be more specific, those substrates are attached to each other by a sealing member formed in the shape of a frame, which is provided between the substrates and in proximity thereto. Also, a liquid crystal composition is enclosed by the sealing member, and polarizers are attached to outer surfaces of the substrates.

At the TFT substrate 2, common electrodes 21 and a driver IC 250 are provided. The common electrodes 21 and the driver IC 250 are electrically connected to each other by signal lines not shown. The driver IC 250 controls a touch-drive operation to be described later. At the color filter substrate 3, detection electrodes 31 are provided. The detection electrodes 31 and the driver IC 250 are electrically connected to each other by signal lines not shown. Touch detection signals from electrodes 31 are transmitted to the driver IC 250.

In the liquid crystal display panel 1, a plurality of pixels are arranged in a matrix. Each of the pixels comprises a common electrode 21, a pixel electrode and a liquid crystal. The common electrodes 21 and pixel electrodes are provided opposite to each other in the TFT substrate 2. To be more specific, the liquid crystal display panel 1 operates in a lateral-electric-field mode such as a fringe field switching (FFS) mode or an in-plane switching (IPS) mode. The alignment of the liquid crystal molecules is changed by applying a voltage between the above substrates. In accordance with this change of the alignment of the liquid crystal molecules, the light transmissivity changes to display an image.

In the above in-cell display device, the common electrodes 21 function not only as electrodes for display operation, but as electrodes for a touch sensor. Therefore, at the time of displaying an image, a common voltage for causing an image to be displayed is applied to a common electrode 21, and at the time of detecting a touch, a drive signal for touch detection is input to the common electrode 21. When the drive signal is input to the common electrode 21, a detection signal is produced from detection electrodes 31 which are separated from the above common electrode 21 by a predetermined distance to have a capacitance. This detection signal is processed to detect a touch position.

FIG. 2 is an enlarged exemplary cross-sectional view schematically showing part of the liquid crystal display panel 1 in the display device according to the embodiment.

As shown in FIG. 2, on the TFT substrate 2, a pixel portion 200 is provided. The common electrodes 21 are applied as portions of pixels to an image display operation. Furthermore, between the TFT substrate 2 and the color filter substrate 3, a liquid crystal composition 4 is held. The detection electrodes 31 provided at the color filter substrate 3 and the common electrodes 21 provided at the TFT substrate 2 produce capacitances. When a drive signal is supplied to a common electrode 21, the voltage of a detection electrode 31 is varied.

At this time, as shown in FIG. 2, when an electrical conductor such as a finger is in proximity to or in contact with the front panel 40 which is located above the detection electrode 31, the capacitance produced between the detection electrode 31 and the common electrode 21 varies. Thus, the variation of the voltage of the detection electrode 31 is different from that in the case where the electrical conductor is not in proximity to or in contact with the detection electrode 31. Therefore, the liquid crystal display panel 1 can detect a touch by detecting the variation of the capacitance generated between the common electrode 21 and the detection electrode 31 in the liquid crystal display panel 1.

In the case where pixel transistors provided in pixel regions in the liquid crystal display device are formed of low-temperature polysilicon (LTPS), the resolution and the transmissivity can be improved. Also, in the case where low-temperature polysilicon is used as a semiconductor which is applied to a drive circuit for the common electrodes, the drive circuit can be formed in a frame area of an inexpensive glass substrate (TFT substrate). For this reason, the low-temperature polysilicon is presently adopted. The low-temperature polysilicon is made by laser annealing at 600° C. or less in its manufacturing process, in order to change its crystal structure into a polycrystal structure. In the low-temperature polysilicon, crystal grain boundaries interfere with current at a high rate. Thus, the low-temperature polysilicon has a lower electron mobility than that of high-temperature polysilicon. This may lower the drive performance of transistors, thus adversely affecting the display quality and touch detection.

It is also conceivable that CMOS transistors having a high drive performance are applied to a drive circuit for the common electrodes. However, the manufacturing process of CMOS transistors is complicated, and the manufacturing cost thereof is high. In light of this point, the drive circuit for the common electrodes is formed of single-channel transistors and in a frame area of the TFT substrate, to reduce lowering of the drive performance of the transistors.

FIG. 3 is an exemplary view schematically showing connections between electrodes and the drive circuit in the display device according to the embodiment. The display device 100 includes electrodes CT which are connected such that they are used as electrodes for display operation and electrodes for touch driving, and a drive circuit 210Z for driving the electrodes CT.

The drive circuit 210Z includes a first thin-film transistor TR1 connected to the electrodes CT and a second thin-film transistor TR2 connected to the electrodes CT. The first and second thin-film transistors TR1 and TR2 are single-channel thin-film transistors. The first thin-film transistor TR1 is turned on when using the electrodes CT as the electrodes for a touch-drive operation, to thereby transmit a first signal VC1 to the electrodes CT. The second thin-film transistor TR2 is turned on when using the electrodes CT as the electrodes for a display operation, to thereby transmit a second signal VC2 to the electrodes CT. A voltage VG1 which is applied to a gate G1 of the first thin-film transistor TR1 when the first thin-film transistor TR1 transmits the first signal VC1 is higher than a voltage VG2 which is applied to a gate G2 of the second thin-film transistor TR2 when the second thin-film transistor TR2 transmits the second signal VC2.

In other words, the drive circuit 210Z, which is included in the in-cell touch panel, includes the first thin-film transistor TR1 and the second thin-film transistor TR2. The first thin-film transistor TR1 exerts a control concerning whether or not to enable transmission of the first signal VC1, the first signal VC1 is a signal for driving the electrode CT at the time of performing the touch-drive operation. The second thin-film transistor TR2 exerts a control concerning whether or not to enable transmission of the second signal VC2, the second signal VC2 is a signal for driving the electrode CT at the time of performing the display operation. When the first signal VC1 is transmitted, the drive circuit 210Z exerts a control such that the voltage VG1 which is applied to the gate G1 of the first thin-film transistor TR1 when the first thin-film transistor TR1 transmits the first signal VC1 is higher than the voltage VG2 which is applied to the gate G2 of the second thin-film transistor TR2 when the second thin-film transistor TR2 transmits the second signal VC2.

Since the voltage VG1 which is applied to the gate G1 when the signal VC1 is transmitted in the first thin-film transistor TR1 is set high, the drive performance can be made high even in the case where the single-channel thin-film transistors are applied. Regarding the first thin-film transistor TR1 only, the voltage VG1 to be applied to the gate G1 is set high, whereby the circuit size can be reduced. Since the drive circuit can be made without CMOS thin-film transistors, its manufacturing process can be simplified. Also, since the drive circuit 210Z for driving the electrodes CT is formed in the frame area of the TFT substrate, the lines between the drive circuit 210Z and the electrodes CT are shortened, thus improving the S/N ratio.

It should be noted that an electrode line CL is connected to the electrodes CT. In a region surrounded by gate lines GL and drain lines DL, a thin-film transistor TR and a pixel electrode PT are provided. A detection electrode TDT is connected to a detection-electrode signal line TDL.

FIG. 4 is an exemplary view schematically showing how elements are mounted on the display device according to the embodiment.

The driver IC 250 is mounted on the TFT substrate 2 as a chip-on-glass (COG). The driver IC 250 transmits an image signal to pixels (not shown) arranged in a matrix in a display area Ad, through conductive lines. Gate scan circuits (gate drive circuits) 220 (220R and 220L) include TFT elements and are located close to a pixel portion (display area) Ad of the TFT substrate 2. In the embodiment, the gate scan circuits 220, as shown in FIG. 4, are provided (as gate scan circuits 220R and 220L) on the right side and left side of the TFT substrate 2, and are supplied from the driver IC 250 with a control signal, etc., through conductive lines.

Also, the gate scan circuits 220 drive the pixels (not shown) arranged in a matrix in the pixel portion Ad, from the right and left sides, respectively.

Tx circuits (common-electrode drive circuits) 210 (210R and 210L) include TFT elements, and are formed on the TFT substrate 2. In the embodiment, the Tx circuits 210, as shown in FIG. 4, are provided (as Tx circuits 210R and 210L) on the right side and left side of the TFT substrate 2. The Tx circuits 210 are supplied from the driver IC 250 with various kinds of signals (such as four-phase signals, a touch drive signal, a signal for distinguishing an image display time and a touch detection time from each other, and a common voltage to be applied to the display operation, through conductive lines (such as SDCK, TSVCOM and VCOMD). Furthermore, the Tx circuits 210R and 210L supply a plurality of common electrode blocks COM1, COM2, . . . , COMn−1, COMn) arranged in parallel, with signals for driving them from both the right and left sides.

In such a manner, in the display device 100 according to the embodiment, the common electrode blocks COM are driven by the Tx circuits 210 formed on the TFT substrate 2. Also, in the display device according to the embodiment, the gate lines GL are driven by the gate scan circuits 220 formed on the TFT substrate 2.

Figure 5:
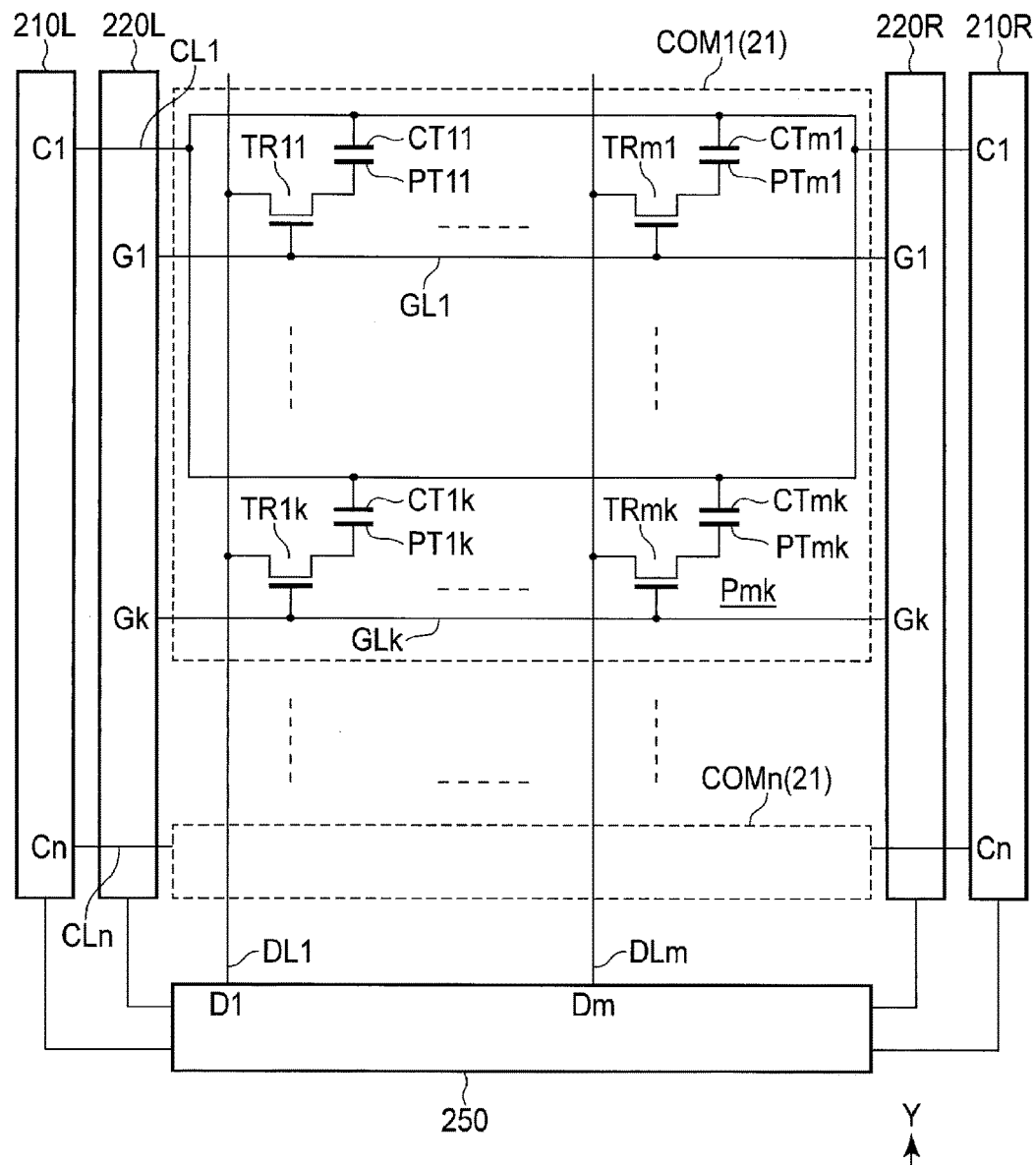
FIG. 5 is an exemplary configuration view of a region provided on a TFT substrate in the display device according to the embodiment.

FIG. 5 is an exemplary configuration view of a region provided on the TFT substrate in the display device according to the embodiment. FIG. 6 is an exemplary configuration view of a region related to touch detection of the display device according to the embodiment. As shown in FIG. 5, in the TFT substrate 2, there are provided (n×k) gate lines GL1 to GLnk extending in the X-direction (from the left side to the right side in the figure), n common-electrode signal lines (common lines) CL1 to CLn, and m drain lines DL1 to DLm extending in the Y-direction (from the lower side to the upper side in the figure) which is perpendicular to the X-direction. In this case, it is assumed as an example that n is 20. Each of the common-electrode blocks COM1 to COMn (corresponding to the common electrodes 21 as shown in FIGS. 1 and 2) comprises k common-electrode lines extending in the X-direction.

An area surrounded by adjacent gate lines including a gate line GLk and adjacent drain lines including a drain line DLm is a pixel area Pmk. In the pixel area Pmk, a thin-film transistor (TFT) TRmk, a pixel electrode PTmk and a common electrode CTmk are provided. The drain, gate and source of the thin-film transistor TRmk are connected to the drain line DLm, the gate line GLk and the pixel electrode PTmk, respectively. Furthermore, the common-electrode line CTmk is spaced from the pixel electrode PTmk. The common-electrode line CTmk is connected to a common-electrode signal line CL1. As well as the pixel area Pmk, areas surrounded by adjacent gate lines and adjacent drain lines are pixel areas. Thus, m×n×k pixel electrodes are present.

At left and right frame portions of the display device 100, the Tx circuits 210L and 210R are provided. Each of the common-electrode signal lines CL1 to CLn extending in parallel with each other in a horizontal direction is driven from its left and right ends at the same time by the Tx circuits 210L and 210R. Alternatively, when these common-electrodes lines CL1 to Cln are driven from their left and right ends, they are alternately driven by the Tx circuits 210L and 210R. Also, at the left and right frame portions, the gate scan circuits 220L and 220R are provided. Each of the gate lines GL1 to GLnk extending in parallel with each other in the horizontal direction is driven from its left and right ends at the same time by the gate scan circuits 220L and 220R. Alternatively, when these gate lines GL1 to GLnk are driven from their left and right ends, they are alternately driven by the gate scan circuits 220L and 220R. Furthermore, referring to FIG. 5, at a lower edge portion of the display device 100, the driver IC 250 is provided. The drain lines DL1 to DLm, which extend in parallel with each other in the vertical direction, are driven from their lower ends in the figure by the driver IC 250.

As shown in FIG. 6, m detection-electrode signal lines TDL1 to TDLm (corresponding to the detection electrodes 31 as shown in FIGS. 1 and 2) are provided on the color filter substrate 3 to extend in the Y-direction (the vertical direction in the figure). Furthermore, as described above, in the pixel area Pmk, the common-electrode line CTmk is provided. On part of the color filter substrate 3 which is located opposite to the pixel area Pmk, the detection electrode TDTmk is provided. Similarly, as on the pixel area Pmk, on the other pixel areas also, common-electrode lines are provided. On parts of the color filter substrate 3 which are located opposite to the other pixel areas, detection electrodes are provided.

It should be noted that the transistors employed in the display device 100 are all n-channel thin-film transistors (single-channel thin-film transistors) formed of low-temperature polysilicon. The Tx circuits 210L and 210R and the gate scan circuits 220L and 220R are formed in the frame edge areas of the TFT substrate 2.

Furthermore, it should be noted that when the display operation or the touch-drive operation is performed in the above manner, the common electrodes are driven in units of one block. Therefore, in the following, a common electrode or electrodes included in a single block are referred to as a common electrode.

FIGS. 7A, 7B and 7C are exemplary views for illustrating bundled touch-drive methods of the display device according to the embodiment. Referring to FIGS. 7A, 7B and 7C, strip-shaped common electrodes common electrodes provided as blocks) are arranged in the vertical direction. The figures show that common electrodes (common electrodes provided as blocks) blacked therein are selected for the touch-drive operation.

FIG. 7A shows a drive method (1Tx scan) in a convention touch-drive operation, in which the common electrodes are successively driven one by one. FIG. 7B shows a drive method (3-bundle, 2-shift drive) in the embodiment, in which the common electrodes are successively bundled and driven such that three common electrodes at a time are bundled for driving and the common electrodes to be bundled are shifted by two common electrodes at a time. FIG. 7C shows a drive method (2-bundle, 2-shift drive) in the embodiment, in which the common electrodes are successively bundled and driven such that two common electrodes at a time are bundled for driving and the common electrodes to be bundled are shifted by two common electrodes at a time. In the display device according to the embodiment, by changing a drive signal to be output by the driver IC 250, either the 3-bundle, 2-shift drive or the 2-bundle, 2-shift drive can be selected.

The structure and operation of the Tx circuits 210, which can achieve the above bundled drives in the embodiment, will be explained.

FIG. 8 is an exemplary block diagram of each of the Tx circuits according to the embodiment. The Tx circuits 210 each comprises a shift register module 211 and a switch module 212. It should be noted that the block diagram of FIG. 8 is also a schematic configuration view for illustrating the function of each Tx circuit 210. The structure of each Tx circuit 210 will be described later in detail.

The shift register module 211 includes n shift registers SRi (i=1 to n). In the shift register module 211, the shift registers SRi (i=1 to n) are vertically connected to each other by output signal lines SROUTi (i=1 to n). It should be noted that to a shift register SR1 of an initial stage, a start signal SDST is input. In the embodiment, the shift registers SRi (i=1 to n) are driven by four-phase clock signals. To be more specific, they are driven by signals from two kinds of clock signal lines SDCKj and SDCKj+2 of four kinds of clock signal lines SDCKj (j=1 to 4).

In a configuration shown in FIG. 8, a clock signal line SDCK1 is connected to a set terminal ck of a shift register SRi, and a clock signal line SDCK3 is connected to a reset terminal CRST of the shift register SRi. Clock signal lines SDCK2 and SDCK4 are respectively connected to a set terminal ck and a reset terminal CRST of a shift register SRi+1; clock signal lines SDCK3 and SDCK1 are respectively connected to a set terminal ck and a reset terminal CRST of a shift register SRi+2; and the clock signal lines SDCK4 and SDCK2 are connected to a set terminal ck and a reset terminal CRST of a shift register SRi+3, respectively.

In the configuration shown in FIG. 8, when a clock signal line SDCKN (N=1 to 4) is connected to the set terminal ck, and a clock signal line SDCKM (M=1 to 4) is connected to the reset terminal CRST, the relationship (N+2)=M mod 4 is satisfied.

It should be noted that subsequent shift registers from shift register SRi+4 onward are divided into groups of four, and the above signal lines are connected to four shift registers of each of the groups, respectively, in the same manner as in the above shift registers SRi to shift register SRi+3. Furthermore, to another reset terminal of each of shift registers SRi (i=1 to n), i.e., to a reset terminal RST thereof, a reset signal SDRST is input, whereas to the reset terminal CRST, a signal on a clock signal line SDCK is input. The reset signal SDRST is a signal which is input when the display device initially starts or resumes operation.

The switch module 212 includes n switch circuits CSWi (i=1 to n). An output signal line SROUTi of a shift register SRi is input to a switch circuit CSWi. Also, to the switch circuit CSWi, one of the four kinds of clock signal lines SDCKi is connected. However, this is not shown in FIG. 8 in order that the illustration thereof be simplified. In addition, in the switch circuit CSWi, a hold circuit is provided which holds a signal supplied through the output signal line SROUTi of the shift register SRi. However, this is not shown in FIG. 8 in order that the illustration thereof be simplified. These structural features will be explained later in detail.

The switch circuit CSWi includes switches SW1, SW2, SW3 and SW4. One of the terminals of the switch SW1 is connected to one of the terminals of the switch SW2, and also to a common-electrode signal line Cli (i=1 to n). To the other terminal of the switch SW1, an alternating-current-drive signal line TSVCOM is connected. To the other terminal of the switch SW2, a direct-current-drive signal line VCOMDC is connected. One of the terminals of the switch SW3 is set to control the switch SW1. To the other terminal of the switch SW3, a first select signal line VCOMSEL1 is connected. One of the terminals of the switch SW4 is set to control the switch SW2. To the other terminal of the switch SW4, a second select signal line VCOMSEL2 is connected. It should be noted that a signal on a first select signal line VCOMSEL1 is a signal which changes to high voltage (a voltage which can turn on a switch formed of an n-channel thin-film transistor) during touch-drive operation. A signal on a second select signal line VCOMSEL2 is a signal which changes to high voltage during display operation. In this structure, based on signals supplied from the first select signal line VCOMSEL1 and the second select signal line VCOMSEL2, a signal supplied from the alternating-current-drive signal line TSVCOM or direct-current-drive signal line VCOMDC is supplied to a common-electrode block COMi through a common-electrode signal line CLi.

It should be noted that although it is not shown in FIG. 8, in the switch module 212, one of the four-phase clock signals is used as a reset signal for a switch circuit CSW.

It should be noted that signals passing from the clock signal lines SDCK1 to SDCK4, the first select signal line VCOMSEL1, the second select signal line VCOMSEL2, the alternating-current-drive signal line TSVCOM and the direct-current-drive signal line VCOMDC are output from the driver IC 250.

Figure 9:
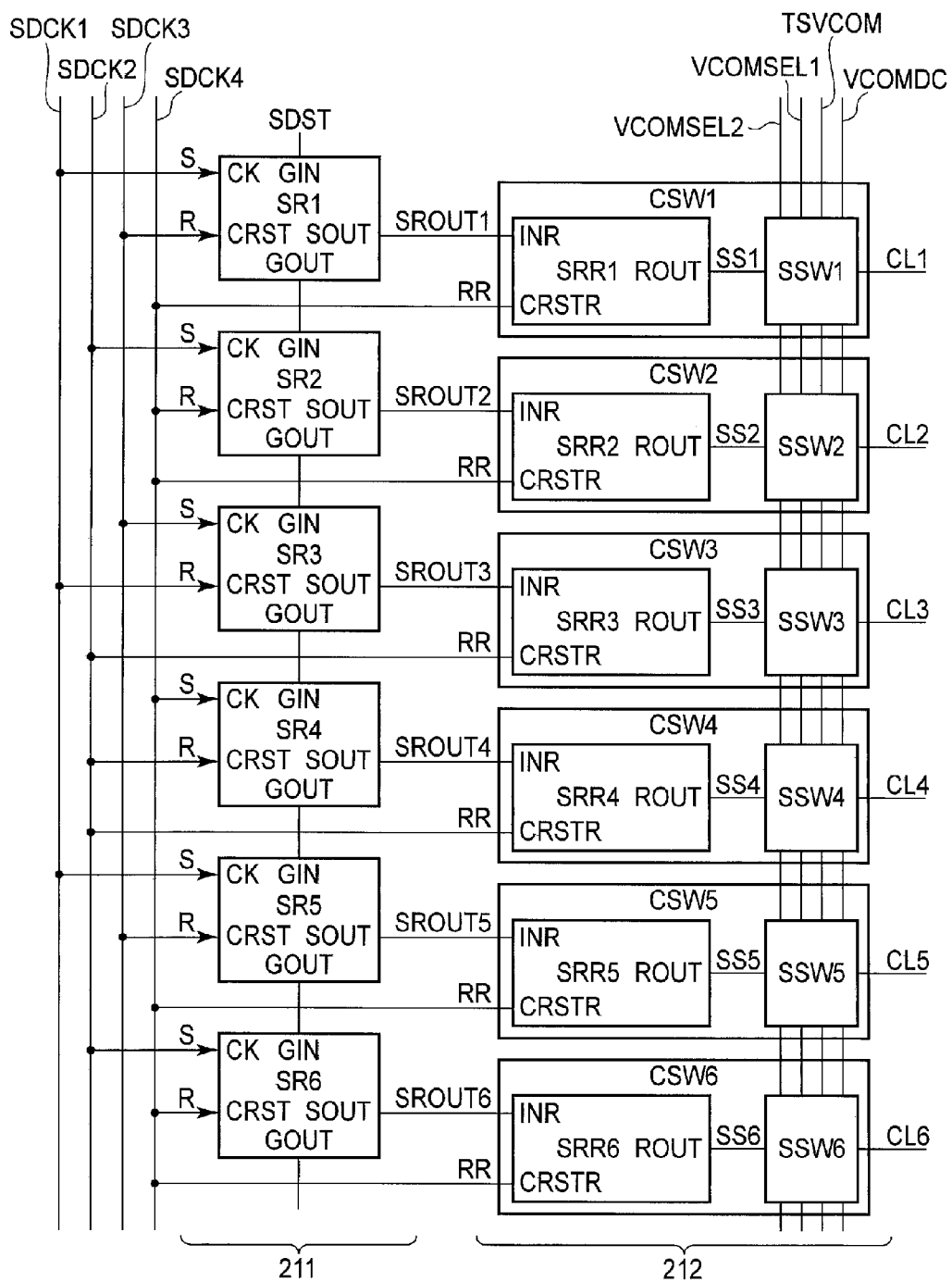
FIG. 9 is an exemplary view showing connections between four kinds of clock signals and a switch module and a shift register module in the display device according to the embodiment.

FIG. 9 is an exemplary view showing connections between four kinds of clock signal lines SDCK and the switch module 212 and the shift register module 211 in the display device according to the embodiment. It should be noted that in order that the illustration of FIG. 9 be simplified, in FIG. 9, with respect to the shift register module 211, only the first six shift registers SRi (i=1 to 6) are shown, and the others are omitted; and with respect to the switch module 212, only the first six switch circuits CSWi (i=1 to 6) are shown, and the others are omitted.

In the structure shown in FIG. 9, the switch module 212 includes n switch circuits CSWi (i=1 to n). Each of the switch circuits CSWi comprises a hold circuit SRRi and a switch select circuit SSWi. To be more specific, a hold circuit SRR holds an output of a shift register SR. The switch select circuit SSW controls ON and OFF of each of the switches SW1 and SW2 in accordance with the value of the output which is held by the hold circuit SRR and output to a hold signal line SS.

The shift register SR includes an input terminal GIN, an output terminal GOUT for a subsequent stage, an output terminal SOUT for the hold circuit, a reset terminal CRST and a clock input terminal CK. To the input terminal GIN, an output from an output terminal GOUT of a shift register SR at a preceding stage is input; and to the clock input terminal CK, one of the four kinds of clock signal lines SDCKj (j=1 to 4) is connected. That is, one of four-phase clock signals is input as a set signal S to the clock input terminal CK. To the reset terminal CRST, a clock signal which leads by two phases with respect to the clock signal input to the clock input terminal CK is input as a reset signal R.

A shift register SRi becomes active upon reception of an output (sift signal) of a shift register SR at a preceding stage, i.e., a shift register SRi−1; and outputs as a sift signal, one of four-phase clock signals which is input from its clock input terminal CK, from its output terminal SOUT to an output signal line SROUTi, and from its output terminal GOUT to a shift register at a subsequent stage, i.e., a shift register SRi+1. It should be noted that as described above with reference to FIG. 8, it may be set that the output (sift signal) of a shift register SR is output from a single output terminal OUT thereof to an input terminal IN of a shift register SR at a subsequent stage and a switch circuit CSW.

The hold circuit SRRi includes an input terminal INR, an input terminal CRSTR and an output terminal ROUT. To the input terminal INR of the hold circuit SRRi, the output signal line SROUTi of the shift register SRi is connected. To the input terminal CRSTR of the hold circuit SRRi, one of the four kinds of clock signal lines SDCKj (j=1 to 4) is connected. That is, one of four-phase clock signals is input as a reset signal RR to the input terminal CRSTR of the hold circuit SRRi.

The hold circuit SRRi holds a signal (sift signal) on the output signal line SROUTi of the shift register SRi. The hold circuit SRRi outputs a signal (sift signal) of an output signal line SROUTi to a switch select circuit SSWi, until it is reset by a clock signal on one of the four kinds of clock signal lines SDCKj (J=1 to 4).

The switch select circuit SSWi includes switches SW1, SW2, SW3 and SW4 which have the same structure as the switches as shown in FIG. 8. Therefore, in the switch select circuit SSWi as shown in FIG. 9, the alternating-current-drive signal line TSVCOM is connected to the switch SW1; the direct-current-drive signal line VCOMDC is connected to the switch SW2; switch SW3 is configured to control the switch SW1; the first select signal line VCOMSEL1 is connected to the switch SW3; the switch SW4 is configured to control the switch SW2; and the second select signal line VCOMSEL2 is connected to the switch SW4.

Referring to FIG. 8, since the hold circuit SRRi is omitted, the output signal line SROUTi of the shift register SRi is directly connected to the switches SW3 and SW4. Referring to FIG. 9, the output signal line SROUTi of the shift register SRi is not directly connected to the switches SW3 and SW4. A signal passing from the output signal line SROUTi of the shift register SRi is held by the hold circuit SRRi.

The hold circuit SRRi outputs the signal on the output signal line SROUTi of the shift register SRi to the hold signal line SSi at the same time as it holds the signal. In FIG. 9, the connections between the hold signal lines SSi and the switches SW3 and SW4 are omitted; however, actually, the hold signal line SSi are connected to the switch select circuit SSWi, and also to the switches SW3 and SW4. Therefore, in the structure as shown in FIG. 9 also, as well as that as shown in FIG. 8, the switches SW3 and SW4 are subjected to on-off control by a signal from the shift register SRi which is held by the hold circuit SRRi.

The signal (hold signal) held by the hold circuit SRRi is kept held from the time at which an output operation of the shift register SRi starts to the time the shift register SRi is reset by a clock signal on one of the four kinds of clock signal lines SDCKj. While the hold signal is being held, the switch select circuit SSWi holds the switches SW3 and SW4 in the on state. As a result, in accordance with the values of the first select signal line VCOMSEL1 and second select signal line VCOMSEL2, the switches SW1 and SW2 are subjected to on-off control to connect either the alternating-current-drive signal line TSVCOM or the direct-current-drive signal line VCOMDC to the common-electrode signal line CLi.

Therefore, in the display device according to the embodiment, based on one of the four-phase clock signals which is input to the input terminal CK of a shift register SR, a hold circuit SRR is made to start to hold a signal; and based on another one of the four-phase clock signals which is input to the reset terminal CRSTR of the hold circuit SRR, the hold circuit SRR is made to end holding of the signal, thereby controlling a period which a touch-drive signal (TSVCOM) is supplied to a common-electrode signal line CLi.

It should be noted that switch circuits CSW from switch circuit CSW5 onward are divided into groups each consisting of four switch circuits CSW, and the clock signal lines SDCK are connected to the shift registers of the switch circuits CSW of each of the groups in the same manner as in the above switch circuits CSW1 to CSW4.

Figure 10:
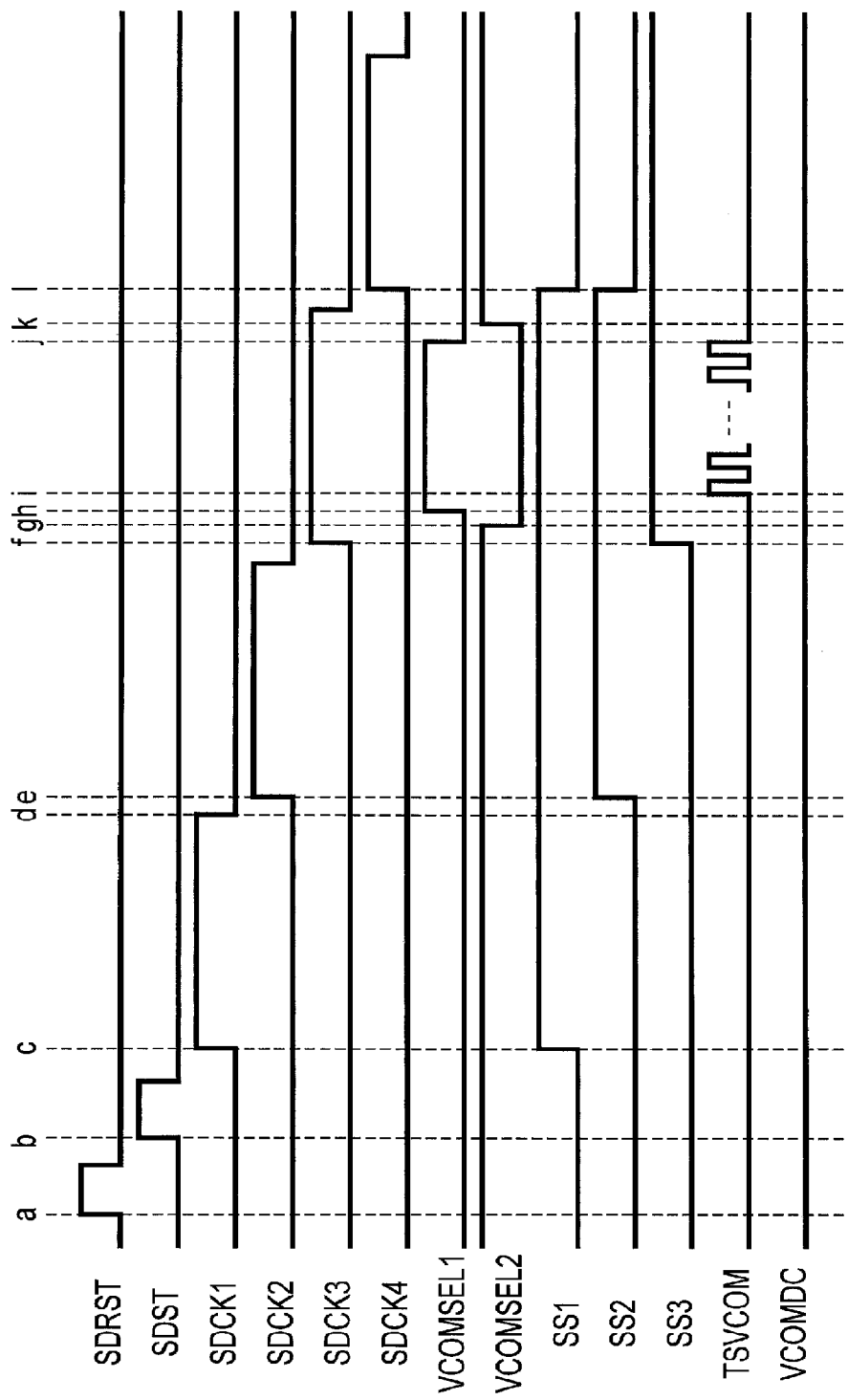
FIG. 10 is an exemplary view showing operation timings of the Tx circuit in the display device according to the embodiment.

FIG. 10 is an exemplary view showing operation timings of the Tx circuits in the display device according to the embodiment. In order that an explanation of the operation of the Tx circuits 210 be simplified, the operation of the Tx circuits 210 will be explained with reference to FIGS. 8 and 9, by primarily referring to the shift register SR1 and a switch circuit CSW1.

[Timing a]

At timing a, when the reset signal SDRST changes to high voltage, all the shift registers SRi (i=1 to n) are reset, signals on the output signal lines SROUTi of all the shift registers SRi change to low voltage. It should be noted that the low voltage is a voltage which can turn off (open) a switch comprising an n-channel thin-film transistor. Thereby, the hold circuit SRRi outputs low voltage as a holding signal to the holding signal line SSi, and turns off (open) the switches SW3 and SW4 of the switch circuit CSWi (i=1 to n). It should be noted that in the switch circuit CSWi (i=1 to n), the switch SW1 is turned off and the switch SW2 is turned on by an initialization circuit to be described later.

[Timing b]

At timing b, when a start signal SDST is changed to high voltage, the start signal SDST changed to high voltage is input to an input terminal GIN of the shift register SR1. The start signal SDST is held at high voltage at the shift register SR1.

[Timing c]

At timing c, when a clock signal on the clock signal line SDCK1 is changed to high voltage, the start signal SDST held at high voltage is transmitted to an internal circuit of the shift register SR1, and a signal on an output signal line SROUT1 of the shift register SR1 changes to high voltage. The signal on the output signal line SROUT1 is held at high voltage by the hold circuit SRR1, and is output by the hold circuit SRR1 to a switch select circuit SSW1 through a hold signal line SS1. While the hold signal line SS1 is at high voltage, switches SW3 and SW4 in the switch circuit CSW1 is in the on state (closed). Since the switch SW3 is in the ON state, and a signal on the first select signal line VCOMSEL1 is at low voltage, a switch SW1 of the switch circuit CSW1 is held at the off state (opened). Since switch SW4 is in the on state, and the signal on the second select signal line VCOMSEL2 is at high voltage, a switch SW2 of the switch circuit CSW1 is held at the on state. Furthermore, an output voltage from the output terminal GOUT of the shift register SR1 is input to an input terminal GIN of a shift register SR2.

At timing c, since the signal on the output signal line SROUT1 is held at high voltage by the hold circuit SRR1, and is output to the switch select circuit SSW1 through the hold signal line SS1, the switch SW3 is in the on state. In this state, when the signal on the first select signal line VCOMSEL1 is changed to high voltage, the switch SW1 is turned on (closed) to enable output of the signal on the alternating-current-drive signal line TSVCOM to the common-electrode signal line CL1. However, in the embodiment, since bundled drive is performed, the signal on the first select signal line VCOMSEL1 is held at low voltage, and the signal on the second select signal line VCOMSEL2 is held at high voltage, until output of the signal on the alternating-current-drive signal line TSVCOM to the common-electrode signal lines CL2 and CL3 is enabled.

[Timing d]

At timing d, when the signal on the clock signal line SDCK1 changes to low voltage, the signal on the output signal line SROUT1 of the shift register SR1 changes to low voltage. However, in the switch circuit CSW1, the hold circuit SRR1 holds the signal on the output signal line SROUT1 at high voltage, and the output state of the switch circuit CSW1 thus remains unchanged.

[Timing e]

At timing e, when the signal on the clock signal line SDCK2 changes to high voltage, the shift register SR2 operates in the same way as in timing c as described above. The signal of high voltage which is input from the input terminal GIN of the shift register SR2 is transmitted to an internal circuit therein, and the signal on an output signal line SROUT2 of the shift register SR2 changes to high voltage. A hold circuit SRR2 holds the signal on the output signal line SROUT2 at high voltage, and outputs the signal to a switch select circuit SSW2 through a hold signal line SS2. While the hold signal line SS2 is at high voltage, switches SW3 and SW4 of a switch circuit CSW2 are in the on state.

However, in the embodiment, since bundled drive is performed, the signal on first select signal line VCOMSEL1 is held at low voltage, and the signal on the second select signal line VCOMSEL2 is held at high voltage, until output of the signal on the alternating-current-drive signal line TSVCOM to the common-electrode signal line CL3 is enabled.

[Timing f]

At timing f, when the signal on the clock signal line SDCK3 is changed to high voltage, the signal on an output signal line SROUT3 of a shift register SR3 changes to high voltage. A hold circuit SRR3 holds the signal on an output signal line SROUT3 at high voltage, and outputs the signal to a switch select circuit SSW3 through a signal line SS3. While the hold signal line SS2 is at high voltage, switches SW3 and SW4 of a switch circuit CSW3 are in the on state.

At timing f, when the signal on the clock signal line SDCK3 changes to high voltage, the shift register SRI is reset. Until a start signal SDST indicating a subsequent operation start is changed to high voltage, the shift register SRI is held at a reset state (initial state). However, in the switch circuit CSW1, the hold circuit SRR1 holds the output signal line SROUT1 at high voltage, and the output state of the switch circuit CSW1 thus remains unchanged.

[Timing g]

At timing g, when the signal on the second select signal line VCOMSEL2 changes to low voltage, since switches SW4 of the switch circuits CSW1, CSW2 and CSW3 are in the on state, switches SW2 of the switch circuits CSW1, CSW2 and CSW3 are turned off.

[Timing h]

At timing h, since the hold signal lines SS1, SS2 and SS3 are held at high voltage, switches SW3 of the switch circuits CSW1, CSW2 and CSW3 are in the ON state. At timing h, when the signal on the first select signal line VCOMSEL1 is changed to high voltage, the signal changed to high voltage is supplies to switches SW1 of the switch circuits CSW1, CSW2 and CSW3 through the switches SW3 of the switch circuits CSW1, CSW2 and CSW3. The switches SW1 of the switch circuits CSW1, CSW2 and CSW3 are turned on at the same time. As a result, as a common-electrode signal, the signal on the alternating-current-drive signal line TSVCOM can be output to the common-electrode signal lines CL1, CL2 and CL3. As a result, bundled drive can be performed.

[Timing i]

At timing i, an alternating-current drive signal which changes to high voltage and low voltage alternately is supplied to the alternating-current-drive signal line TSVCOM. To the common-electrode signal lines CL1, CL2 and CL3, the alternating-current-drive signal is output.

[Timing j]

At timing j, the signal on the first select signal line VCOMSEL1 changes to low voltage. Since the hold signal lines SS1, SS2 and SS3 are held at high voltage, and the switches SW3 of switch circuits CSW1, CSW2 and CSW3 are in the on state, the switches SW1 of the switch circuits CSW1, CSW2 and CSW3 are turned off. Thereby, the signal on the alternating-current-drive signal line TSVCOM are not output to the common-electrode signal lines CL1, CL2 and CL3.

[Timing k]

At timing k, the signal on the second select signal line VCOMSEL2 changes to high voltage. Since the switches SW4 of the switch circuits CSW1, CSW2 and CSW3 are in the on state, the switches SW2 of the switch circuits CSW1, CSW2 and CSW3 are turned on. Thereby, as a common-electrode signal, the signal on the direct-current-drive signal line VCOMDC is output to the common-electrode signal lines CL1, CL2 and CL3,

[Timing l]

At timing l, the signal on the clock signal line SDCK4 changes to high voltage. The hold circuits SRR1 and SRR2 are reset, and the voltages of the hold signal lines SS1 and SS2 change to low. Next, until the signal on the output signal line SROUT1 or SROUT2 change to high voltage, the hold signal lines SS1 and SS2 are held low voltage. Furthermore, the hold circuit SRR3 is not reset, and the hold signal line SS3 is held high voltage.

Clock signals on the clock signal lines SDCKj, SDCK(j+1) and SDCK(j+2) which are to be output to the output signal lines SROUTi, SROUT(i+1) and SROUT(i+2) are successively held by the hold circuits SRRi, SRR(i+1) and SRR(i+2). Furthermore, the hold circuits SRRi and SRR(i+1) are reset by a clock signal on a clock signal line SDCK(j+3). By way of this operation, it is possible to achieve a drive method (3-bundle, 2-shift drive) in which common electrodes are successively bundled and driven such that three common electrodes at a time are bundled for driving and the common electrodes to be bundled are shifted by two common electrodes at a time.

It should be noted that the above explanation refers to the case where driving is performed, with the common-electrode signal lines CL1, CL2 and CL3 bundled; however, it is also possible to perform driving, with the common-electrode signals CL1 and CL2 bundled. For example, between timing e and timing f at which the common-electrode signal lines CL1 and CL2 can be driven, a period is provided in which the signal on the first select signal line VCOMSEL1 changes to high voltage and the signal on the second select signal line VCOMSEL2 changes to low voltage. The signal on the alternating-current-drive signal line TSVCOM is repeatedly changed between high voltage and low voltage (it is subjected to alternating-current driving), and then output to the common-electrode signal lines CL1 and CL2. By way of this control, it is possible to achieve a drive method (2-bundle, 2-shift drive) in which common electrodes are successively bundled and driven such that two common electrodes at a time are bundled and the common electrodes to be bundled are shifted by two common electrodes at a time.

The circuit structures and operations of the shift registers SR and switch circuits SW will now be explained in detail.

[Shift Register Circuit]

FIG. 11 is an exemplary circuit diagram showing an example of a shift register SR in the display device according to the embodiment. As shown in the figure, two kinds of clock signal lines, i.e., clock signal lines SDCKn and SDCKn+2, are connected to the shift register SR. In this circuit diagram, the symbols "ST" and "N" denote a transistor and a node, respectively. In the embodiment, it is assumed that transistors in the circuit are formed of low temperature polysilicon (LTPS); however, the circuit may be provided as a transistor circuit employing other kind of semiconductor transistors such as amorphous transistors.

As shown in FIG. 11, the shift register SR comprises a plurality of transistors ST. The transistors ST are made to have a high withstanding voltage because of a double-gate structure in which two transistors are stacked together to withstand a voltage rising when a clock signal changes to high voltage. It should be noted that the high voltage of the high-voltage power line VGH may be equal to or less than the high voltage of a clock signal CK on a clock signal line SDCK, as long as it is a voltage at which a transistor is made to conduct.

A diode-connected transistor ST1 takes from a preceding circuit, input GIN−1 into a circuit in the shift register SR. A transistor ST2 fixes the voltage of the gate of a transistor ST5 to be described later, to low voltage. A transistor ST3 resets the voltage of a hold node N1 upon input of a signal on the clock signal line SDCKn+2. A transistor ST12 is operated by a signal on the clock signal line SDCKn+2, and charges a hold node N2. A transistor ST4 resets a hold node N2. A transistor ST5 outputs a signal to an output signal line SROUT connected to a switch circuit CSW.

A transistor ST6 is operated by a high voltage of a hold node N2, and fixes a signal on the output signal line SROUT to low voltage. A transistor ST7 is operated by an input GIN from the preceding stage, and resets the hold node N2. A transistor ST8 is operated by a reset signal SDRST, and initializes the shift register SR. A transistor ST10 is a voltage reduction transistor which limits an upper limit of a voltage raised by the transistor ST5 to the high voltage of the high-voltage power line VGH. The transistor ST5 outputs a signal to the output signal line SROUT, and at the same time a transistor ST9 transfers a signal to an output line GOUT for the subsequent stage. A transistor ST11 is controlled by the hold node N2, and fixes a signal on the output line GOUT at low voltage. It should be noted that a capacitance SC2 prevents leakage from the hold node N2.

As indicated by a bold black line in FIG. 11, the shift register SR is reset to its initial state by a signal on the clock signal line SDCKn+2. With reference to FIG. 11, the operation of the shift register SR will be explained.

As a reset operation, when the reset signal SDRST changes to high voltage, the transistor ST8 is made to conduct, and the voltage of the hold node N2 changes to the high voltage of the high-voltage power line VGH. The transistor ST2 is made to conduct, and the voltage of the node N1 changes to the low voltage of a low-voltage power line VSS.

Then, when the input GIN from the preceding stage changes to high voltage, the transistor ST7 is made to conduct. The voltage of the node N2 changes to the low voltage of the low-voltage power line VSS, and the transistor ST2 is made to stop conducting. Also, the transistor ST1 is made to conduct, and the voltage of the node N1 changes to high. The transistor ST1 is diode-connected. This state is thus maintained. When the voltage of the node N1 changes to high, the transistors ST5 and ST9 are made to conduct by the transistor ST10 having a gate to which the high voltage of the high-voltage power line VGH is applied.

Subsequently, when the signal on the clock-signal line SDCKn changes to high voltage, the high voltage causes the signal on the output signal line SROUT to be changed to high voltage by the transistor ST5 which is made to conduct, and also causes the signal on output line GOUT to be changed to high voltage by the transistor ST9 which is made to conduct. Furthermore, when the signal on clock-signal line SDCKn changes to low voltage, the signals on the output signal line SROUT and the output line GOUT change to low voltage.

Thereafter, when the signal on the clock signal line SDCKn+2 changes to high voltage, the transistor ST3 is made to conduct, and the node N1 is discharged and its voltage deceases to low voltage. Also, since the transistor ST12 is made to conduct, the voltage of the node N2 increases to high voltage. When the voltage of the node N2 changes to high voltage, the transistors ST6 and ST11 are made to conduct. Then, the voltages of the output signal line SROUT and the output line GOUT are fixed to the low voltage of the low-voltage power line VSS.

In such a manner, the shift register SR as shown in FIG. 11 outputs a clock signal supplied from the clock signal line SDCKn to the output signal line SROUT, and is reset by a clock signal supplied from the clock signal line SDCKn+2. It should be noted that clock signals supplied from the clock signal lines SDCK are four-phase clock signals. A clock signal supplied from the clock signal line SDCKn+2 is a clock signal which leads by two phases with respect to a clock signal passing from the clock signal line SDCKn.

[Switch Circuit]

Figure 12:
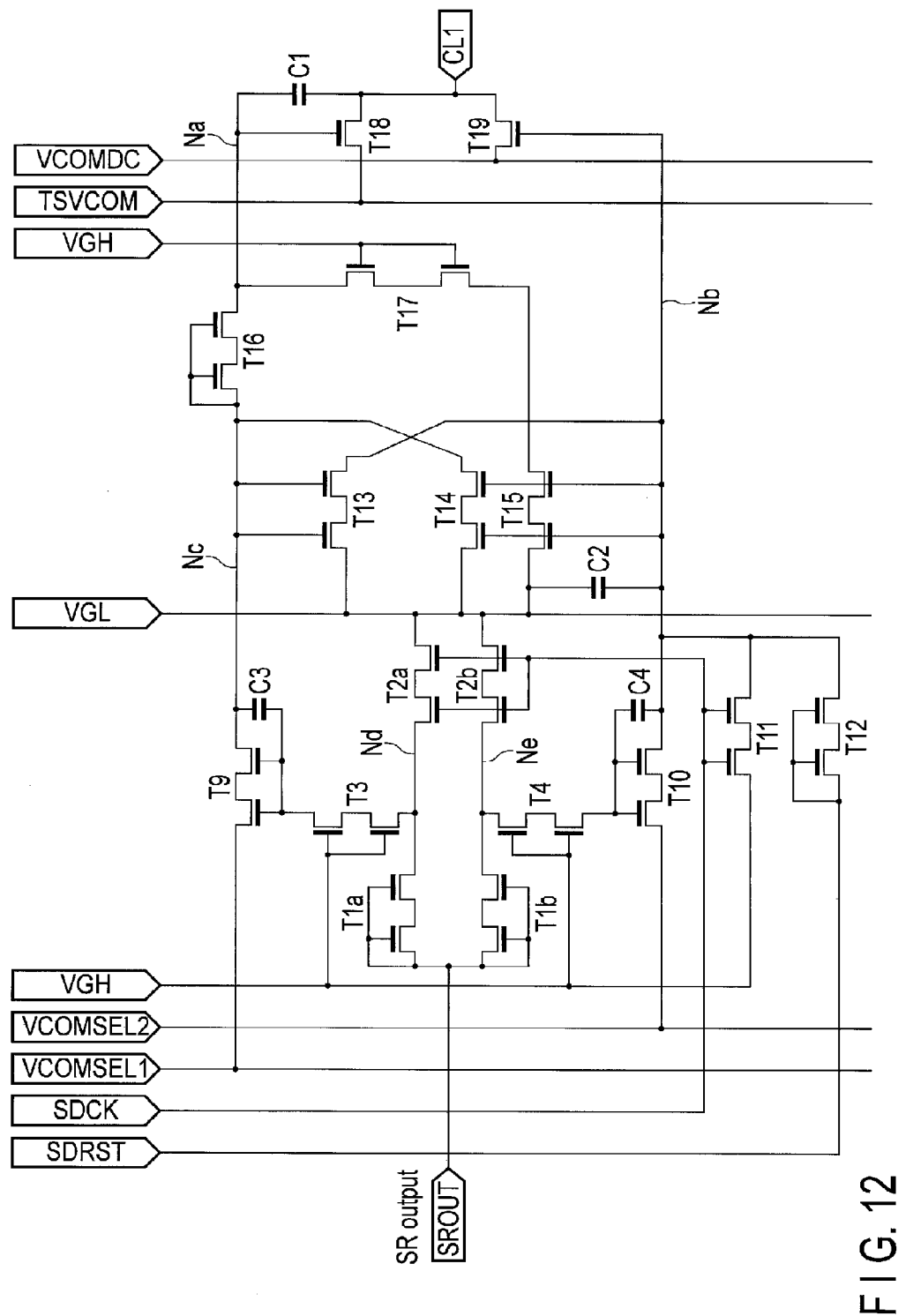
FIG. 12 is an exemplary circuit diagram showing an example of a switch circuit in the display device according to the embodiment.

FIG. 12 is an exemplary circuit diagram showing an example of a switch circuit CSW in the display device according to the embodiment. A switch circuit CSWi (i=1 to n) includes thin-film transistors T1a, T1b, T2a, T2b and T3 to T19 and holding capacitors C1 to C4. In each of the thin-film transistors T1a, T1b, T2a, T2b and T3 to T19, two thin-film transistors are connected in series to each other. However, in the following explanation, in order that it be simplified, the above two thin-film transistors connected in series to each other is described as a single thin-film transistor. Also, the two transistors connected in series to each other are intended to reduce the voltage between the source and drain. It should be noted that the breakdown voltage between the source and drain of each of the thin-film transistors is approximately 15V. It should be noted that the High voltage and Low voltage of each of the signals are 12V and −8V, respectively, except for the signal on the alternating-current-drive signal line TSVCOM. The signal on the direct-current-drive signal line VCOMDC is a voltage having a value close to 0V to 6V. The signal on the alternating-current-drive signal line TSVCOM may be driven with voltage fluctuations such as fluctuations of 0 to 5V, or may be driven with voltage fluctuations such as fluctuations of 0V to 10V.

It should be noted that in the switch circuit CSW as shown in FIG. 12, the thin-film transistors T3 to T19 correspond to the switch select circuits SSW as shown in FIG. 9. To be more specific, the thin-film transistors T18 and T19 correspond to the switches SW1 and SW2 as shown in FIG. 8. The thin-film transistors T9 and T10 correspond to the switches SW3 and SW4. Furthermore, the thin-film transistor T1a, T1b, T2a and T2b correspond to the hold circuits SRR as shown in FIG. 9.

As shown in FIG. 12, at output stages connected to the common-electrode signal lines CLi (i=1 to n), the thin-film transistor T18 (first thin-film transistor) and the thin-film transistor T19 (second thin-film transistor), which are to be alternately driven, are provided in parallel with each other. To second electrodes of the thin-film transistors T18 and T19, output terminals of common-electrode signal line CLi are connected. The thin-film transistors T18 and T19 correspond to the switches SW1 and SW2 as shown in FIG. 8. A first electrode of the thin-film transistor T18 is connected to the alternating-current-drive signal line TSVCOM, through which an alternating-current voltage is applied to the common-electrode signal line Cli (i=1 to n). A first electrode of the thin-film transistor T19 is connected to the direct-current-drive signal line VCOMDC, through which a direct-current voltage is applied to the common-electrode signal line Cli (i=1 to n). The second electrode of the thin-film transistor T18 is connected to a first electrode of the holding capacitor C1.

A second electrode of the holding capacitor C1 is connected to a gate of the thin-film transistor T18, a second electrode (cathode) of the thin-film transistor (third thin-film transistor) T16, which is diode-connected, and a first electrode of the thin-film transistor T17. This connection point will be referred to as a first node Na. The thin-film transistor T16 and the holding capacitor C1 form a booster circuit (first circuit) which boosts the voltage of the first node Na. A second electrode of thin-film transistor T17 is connected to a first electrode of thin-film transistor T15. A gate of thin-film transistor T17 is connected to the high-voltage power line VGH. A second electrode of the thin-film transistor T15 is connected to a low-voltage power line VGL. A gate of the thin-film transistor T15 is connected to a second node Nb. The thin-film transistors T15 and T17 form a discharge circuit (reset circuit, second circuit) which discharges the first node Na. The thin-film transistor T17 is provided between the first node Na and the thin-film transistor T15, whereby the voltage between the source and drain of the thin-film transistor T15 can be reduced.

A first electrode (anode) of the thin-film transistor T16 is connected to a second electrode of the thin-film transistor (fourth thin-film transistor) T9, a first electrode of the holding capacitor C3 and a first electrode of thin-film transistor T14. A first electrode and a gate of the thin-film transistor T9 are respectively connected to the first select signal line VCOMSEL1 and a second electrode of the holding capacitor C3. The thin-film transistor T9 corresponds to the switch SW3 as shown in FIG. 8. A second electrode of the holding capacitor C3 is connected to a second electrode of the thin-film transistor (sixth thin-film transistor) T3. A first electrode of the thin-film transistor T3 is connected to a second electrode of thin-film transistor T1a and a first electrode of the thin-film transistor T2a; a gate of the thin-film transistor T3 is connected to the high-voltage power line VGH; and the second electrode of the thin-film transistor T3 is connected to the gate of thin-film transistor T9. A second electrode of the thin-film transistor T14 is connected to the low-voltage power line VGL; and a gate of thin-film transistor T14 is connected to the node Nb. The thin-film transistor T14 forms a discharge circuit (reset circuit, fourth circuit) which discharges a third node Nc.

A gate of the thin-film transistor T19 is connected to a first electrode of the holding capacitor C2, a first electrode of the holding capacitor C4, a second electrode of the thin-film transistor (fifth thin-film transistor) T10, a second electrode of the thin-film transistor T11, a second electrode (cathode) of the thin-film transistor T12, which is diode-connected, and a first electrode of the thin-film transistor T13. A second electrode of the holding capacitor C2 is connected to the low-voltage power line VGL. A first electrode and a gate of the thin-film transistor T10 are respectively connected to the second select signal line VCOMSEL2 and a second electrode of the holding capacitor C4. The thin-film transistor T10 corresponds to the switch SW4 as shown in FIG. 8. A second electrode of the holding capacitor C4 is connected to a second electrode of the thin-film transistor (seventh thin-film transistor) T4. A first electrode of the thin-film transistor T4 is connected to a second electrode of the thin-film transistor T1b and a first electrode of the thin-film transistor T2b; a gate of the thin-film transistor T4 is connected to the high-voltage power line VGH; and the second electrode of the thin-film transistor T4 is connected to a gate of thin-film transistor T10. The thin-film transistor T13 forms a discharge circuit (reset circuit, third circuit) which discharges the second node Nb.

A first electrode (anode) of the thin-film transistor (sixth thin-film transistor) T1a and a first electrode (anode) of the thin-film transistor (seventh thin-film transistor) T1b are connected to an output signal line SROUT, the thin-film transistors T1a and T1b being diode-connected. A second electrode (cathode) of the thin-film transistor T1a is connected to the first electrode of thin-film transistor T3 and a first electrode of thin-film transistor T2a. Furthermore, a second electrode and a gate of the thin-film transistor T2a are connected to the low-voltage power line VGL and clock signal line SDCK, respectively. The second electrode (cathode electrode) of the thin-film transistor T1b is connected to the first electrode of the thin-film transistor T4 and the first electrode of the thin-film transistor T2b. Furthermore, a second electrode and a gate of thin-film transistor T2b are connected to the low-voltage power line and the clock signal line SDCK, respectively. The thin-film transistors T1a and T1b form an input circuit. Therefore, the thin-film transistors T2a and T2b form a discharge circuit (reset circuit) which discharges fourth and fifth nodes Nd and Ne.

A high voltage output from a shift register SR is held by the diode-connected thin-film transistor T1a at the fourth node Nd and by the diode-connected thin-film transistor T1b at the fifth node Ne. The high voltages held at the fourth node Nd and fifth node Ne are discharged by the thin-film transistors T2a and T2b. Therefore, the thin-film transistors T1a, T1b, T2a and T2b, which form a hold circuit SRR, hold/discharge the high voltage output from the shift register SR.

Furthermore, the first electrode and gate of the thin-film transistor T11 are connected to the high-voltage power line VGH and clock signal line SDCK, respectively. The clock signal line SDCK is connected to a reset terminal CRSTR of a switch circuit CSWi (i=1 to n) as shown in FIG. 9. In an example shown in FIG. 9, where i≡1 mod 4 or i≡2 mod 4, the clock signal line SDCK4 is connected to the reset terminal CRSTR of the switch circuit CSWi (i=1 to n); and where i≡3 mod 4 or i≡0 mod 4, the clock signal line SDCK2 is connected to the reset terminal CRSTR.

The first electrode (anode) and second electrode (cathode) of the diode-connected thin-film transistor T12 are connected to a reset signal line SDRST and the second node Nb, respectively. The second electrode of the thin-film transistor T13 is connected to the low-voltage power line VGL; and the gate of the thin-film transistor T13 is connected to the third node Nc. The thin-film transistors T11 and T12 form a charge circuit (initialization circuit, fifth circuit) which charges the holding capacitor C2 (second node Nb). The thin-film transistor T13 forms a discharge circuit (reset circuit, sixth circuit) which discharges the second node Nb.

Next, with reference to a timing chart of FIG. 10 and a circuit diagram of FIG. 12 showing the switch circuit, the operation of the switch circuit CSW1 in the display device 100 according to the embodiment will be explained. It should be noted that the operations of other switch circuits CSW are the same as that of the switch circuit CSW1.

[Timing a]

At timing a, when a reset signal SDRST is changed to high voltage, the reset signal SDRST is also input to the shift register SR as shown in FIG. 11, and the output from the output signal line SROUT1 of the shift register SR1, which is input to the switch circuit CSW1, changes to low voltage. At the fourth and fifth nodes Nd and Ne of the switch circuit CSW1, the low voltage is maintained. Since the gates of the thin-film transistors T3 and T4 are given the high voltage of the high-voltage power line VGH, the thin-film transistors T3 and T4 are in the on state. Thus, the thin-film transistors T9 and T10 are in the off state because of the low voltage at the fourth and fifth nodes Nd and Ne.

On the other hand, the reset signal SDRST of high voltage is transmitted to the second node Nb through the thin-film transistor T12, and the holding capacitor C2 is charged. Furthermore, since the thin-film transistors T15 and T17 are made to conduct, low voltage of the low-voltage power line VGL is given to the first node Na. Furthermore, since the thin-film transistor T14 is made to conduct, low voltage of the low-voltage power line VGL is given to the third node Nc. As a result, the thin-film transistor T18 is turned off, and the thin-film transistor T19 is turned on. Therefore, the signal on the direct-current-drive signal line VCOMDC is output to the common-electrode signal line CL1.

[Timing c]

At timing c, when the signal on the clock signal line SDCK1 changes to high voltage, the signal on the output signal line SROUT1 of the shift register SR1 changes to high voltage. When the signal on the output signal line SROUT1 changes to high voltage, it is held at the high voltage by the diode-connected thin-film transistor T1a. Thereby, the holding capacitor C3 is charged through the thin-film transistor T3, and the thin-film transistor T9 is turned on. Since the signal on the first select signal line VCOMSEL1 is at low voltage, the thin-film transistor T18 is held in the off state. Furthermore, at the diode-connected thin-film transistor T1b, the signal is held at high voltage, as a result of which the holding capacitor C4 is charged through the thin-film transistor T4, and the thin-film transistor T10 is turned on. Since the signal on the second select signal line VCOMSEL2 is at high voltage, the thin-film transistor T19 is kept in the on state. Therefore, the signal on the direct-current-drive signal line VCOMDC is output to the common-electrode signal line CL1.

[Timing d]

At timing d, when the signal on the clock signal line SDCK1 is changed to low voltage, the signal on the output signal line SROUT1 changes to low voltage. However, in the switch circuit CSW1, the signal is held at high voltage by the diode-connected thin-film transistors T1a and T1b. Thus, at the fourth and fifth nodes Nd and Ne, the voltage is not changed to low voltage. Therefore, the signal on the direct-current-drive signal line VCOMDC is kept output to the common-electrode signal line CL1.

[Timing e]

At timing e, when the signal on the clock signal line SDCK2 changes to high voltage, the signal on the output signal line SROUT2 of the shift register SR2 changes to high voltage. When the signal on the output signal line SROUT2 changes to high voltage, at the fourth and fifth nodes Nd and Ne, the signals are held at high voltage by the thin-film transistors T1a and T2a of the switch circuit CSW2.

[Timing f]

At timing f, when the signal on the clock signal line SDCK3 changes to high voltage, the signal on the output signal line SROUT3 of the shift register SR3 changes to high voltage. When the signal on the output signal line SROUT3 changes to high voltage, at the fourth and fifth nodes Nd and Ne, the signals are held at high voltage by the thin-film transistors T1a and T2a of the switch circuit CSW3.

[Timing g]

At timing g, at the fourth and fifth nodes Nd and Ne of the switch circuits CSW1, CSW2 and CSW3, the signals are held at high voltage, and the thin-film transistor T10 is in the on state. At timing g, when the signal on the second select signal line VCOMSEL2 is changed to low voltage, the fourth node Nb is discharged, and the thin-film transistor T19 is turned off.

[Timing h]

At timing h, when the signal on the first select signal line VCOMSEL1 is changed to high voltage, the gate voltage of the thin-film transistor T9 of each of the switch circuits CSW1, CSW2 and CSW3 is raised by the holding capacitor C3, and high voltage which will not lower is applied to the third node Nc. The high voltage of the third node Nc is applied to the gate of the thin-film transistor T18 and the holding capacitor C1 through the thin-film transistor T16, and the holding capacitor C1 is charged. Thereby, the thin-film transistor T18 is turned on, thereby enabling output of the signal on the alternating-current-drive signal line TSVCOM to the common-electrode signal lines CL1, CL2 and CL3, and also enabling execution of bundled drive.

[Timing i]

The signal on the alternating-current-drive signal line TSVCOM can be output to the common-electrode signal lines CL1, CL2 and CL3. At timing i, an alternating-current drive signal on the alternating-current-drive signal line TSVCOM, which is repeatedly changed between high voltage and low voltage, is output to the common-electrode signal lines CL1, CL2 and CL3, and a bundle driving is performed.

[At Timing j]

At the fourth and fifth nodes Nd and Ne of each of the switch circuits CSW1, CSW2 and CSW3, the signals are held at high voltage, and the thin-film transistors T9 of each of the switch circuits CSW1, CSW2 and CSW3 is in the on state. At timing j, when the signal on the first select signal line VCOMSEL1 changes to low voltage, the voltage of the third node Nc changes to low. However, since the diode-connected thin-film transistor T16 is present, the voltage of the first node Na does not change to low. Thus, the thin-film transistor T18 is held in the on state.

[Timing k]

At timing k, when the signal on the second select signal line VCOMSEL2 changes to high voltage, the gate voltage of the thin-film transistor T10 of each of the switch circuits CSW1, CSW2 and CSW3 is raised by the holding capacitor C4, and high voltage, which is sufficiently maintained, is applied to the second node Nb, and the thin-film transistor T19 is turned on. Furthermore, when the voltage of the second node Nb changes to high, the voltage of the first node Na is changed to low by the thin-film transistors T15 and T17, and the thin-film transistor T18 is turned off. Furthermore, the voltage of the third node Nc is changed to low by the thin-film transistor T14. Thereby, the signal on the direct-current-drive signal line VCOMDC is output to the common-electrode signal line CL1.

[Timing l]

At timing l, when the signal on the clock signal line SDCK as shown in FIG. 12 (the clock signal on the clock signal line SDCK4 which is a reset signal in each of the switch circuits CSW1 and CSW2 in FIG. 9) is changed to high voltage, the fourth and fifth nodes Nd and Ne are set at low voltage by the thin-film transistors T2a and T2b. Thereby, the thin-film transistors T9 and T10 are turned off.

On the other hand, since the clock signal line SDCK4 is not connected to the switch circuit CSW3, the fourth and fifth nodes Nd and Ne of the switch circuit CSW3 are held at high voltage.

Subsequently, while referring to the above Tx circuits 210, the following explanation is given with respect to a drive method in which a plurality of common electrodes are successively bundled and driven such that the common electrodes to be bundled for driving are shifted by two common electrodes at a time.

FIG. 13 is an exemplary view for illustrating a drive method (3-bundle, 2-shift drive) in which in the display device according to the embodiment, common electrodes are successively bundled and driven such that three common electrodes at a time are bundled for driving and the common electrodes to be bundled are shifted by two common electrodes at a time.

The timing chart of FIG. 13 shows the transition of the states of a start signal SDST, signals on clock signal lines SDCKj (j=1 to 4), a signal on the alternating-current-drive signal line TSVCOM and signals on common-electrode signal lines CLi (i=1 to n, and in the case shown in FIG. 13, n=11), during a touch-drive operation. It should be noted that the above start signal SDST, the signals on the clock signal lines SDCKj (j=1 to 4) and the signal on the alternating-current-drive signal line TSVCOM are output from the driver IC 250 to the Tx circuits 210. Furthermore, outputs SS of the hold circuit SRR correspond to values held at the nodes Nd and Ne as shown in FIG. 12.

At timing t1, the driver IC 250 inputs start signal SDST changed to high voltage to the shift register SR1. At timing t2, when the driver IC 250 changes the signal on the clock signal line SDCK1 to high voltage, output of the signal on the alternating-current-drive signal line TSVCOM to the common-electrode signal line CL1 of the Tx circuit 210 is enabled. Output of the signal on the alternating-current-drive signal line TSVCOM to the common-electrode signal line CL1 is kept enabled, even after the signal on the clock signal line SDCK1 changes to low voltage. At timings t3 and t4, when the driver IC 250 changes the signals on the clock signal lines SDCK2 and SDCK3 to high voltage, output of the signal on the alternating-current-drive signal line TSVCOM to the common-electrode signal lines CL2 and CL3 is enabled, and this state is maintained.

Therefore, at timing t4, the driver IC 250 changes the signal on the clock signal line SDCK3 to high voltage, and then when the driver IC 250 outputs a string of pulses (alternating-current drive signal) to the alternating-current-drive signal line TSVCOM, these pulses are output to the common-electrode signal lines CL1 to CL3, i.e., three common electrode signal lines, at the same time. That is, three common electrodes can be driven in a bundle.

At timing t5, when the driver IC 250 changes the signal on the clock signal line SDCK4 to high voltage, output of the signal on the alternating-current-drive signal line TSVCOM to the common-electrode signal line CL4 of the Tx circuit 210 is enabled. Also, since the signal on the clock signal line SDCK4 that has been changed to high voltage is input to the reset terminal CRSTR of each of the switch circuits CSW1 and CSW2, the signal on the alternating-current-drive signal line TSVCOM, output of which to the common-electrode signal lines CL1 and CL2 is enabled, is reset. At timing t6, when the driver IC 250 changes the signal on clock signal line SDCK1 to high voltage, output of the signal on the alternating-current-drive signal line TSVCOM to the common-electrode signal line CL5 of the Tx circuit 210 is enabled.

At timing t6, the driver IC 250 changes the signal on the clock signal line SDCK1 to high voltage, and then when the driver IC 250 outputs a string of pulses (alternating-current drive signal) to alternating-current drive signal line TSVCOM, the pulses are output to the common-electrode signal lines CL3, CL4 and CL5, i.e., three common-electrode signal lines, at the same time. That is, it is possible for common electrodes to be successively bundled and driven such that three common electrodes at a time are bundled for driving and the common electrodes to be bundled are shifted by two common electrodes at a time.

At timing t7, when the driver IC 250 changes the signal on the clock signal line SDCK2 to high voltage, output of the signal on the alternating-current-drive signal line TSVCOM to the common-electrode signal line CL6 of the Tx circuit 210 is enabled. Also, since the signal on the clock signal line SDCK2 that has been changed to high voltage is input to the reset terminal CRSTR of each of the switch circuits CSW3 and CSW4, the signal on the alternating-current-drive signal line TSVCOM, output of which to the common-electrode signal lines CL3 and CL4 is enabled, is reset. At timing t8, when the driver IC 250 changes the signal on the clock signal line SDCK3 to high voltage, output of the signal on the alternating-current-drive signal line TSVCOM to the common-electrode signal line CL7 of the Tx circuit 210 is enabled.

Thereafter, as in the above drive method, the driver IC 250 selects clock signal lines SDCK successively in such a way as to select two clock signal lines SDCK at a time, and changes the signals on the selected clock signal lines SDCK to high voltage. Then, the driver IC 250 repeatedly outputs a string of pulses (alternating-current drive signal) to the alternating-current-drive signal line TSVCOM in the above manner. By way of this drive method, it is possible to achieve a drive method (3-bundle, 2-shift drive) in which common electrodes are successively bundled and driven such that three common electrodes at a time are bundled and the common electrodes to be bundled are shifted by two common electrodes at a time.

Figure 14:
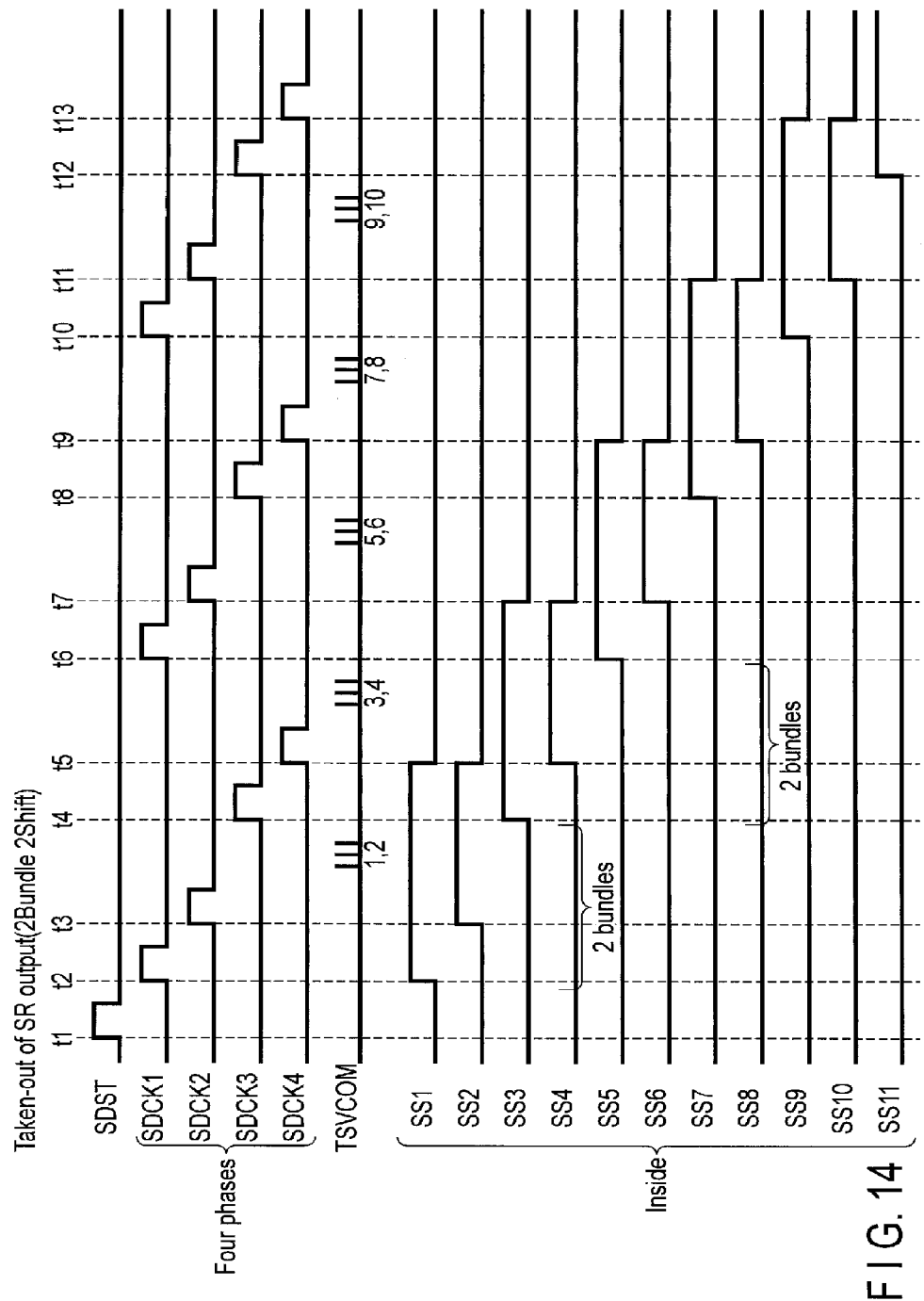
FIG. 14 is an exemplary view for illustrating a drive method in which in the display device according to the embodiment, common electrodes are successively bundled and driven such that two common electrodes at a time are bundled for driving and the common electrodes to be bundled are shifted by two common electrodes at a time.

FIG. 14 is an exemplary view for illustrating a drive method (2-bundle, 2-shift drive) in which in the display device according to the embodiment, common electrodes are successively bundled and driven such that two common electrodes at a time are bundled and the common electrodes to be bundled are shifted by two common electrodes at a time.

The timing chart of FIG. 14 shows the transition of the states of the start signal SDST, the signals on the clock signal lines SDCKj (j=1 to 4), the signal on the alternating-current-drive signal line TSVCOM, and the signals on the common-electrode signal lines CLi (i=1 to n, and in the case shown in FIG. 14, n=11), during a touch-drive operation. It should be noted that the start signal SDST, the signal on clock signal line SDCKj (j=1 to 4) and the signal on the alternating-current-drive signal line TSVCOM are output from the driver IC 250 to the Tx circuits 210.

At timing t1, the driver IC 250 inputs the start signal SDST that has been changed to high voltage to the shift register SR1. At timing t2, when the driver IC 250 changes the signal on the clock signal line SDCK1 to high voltage, output of the signal on the alternating-current-drive signal line TSVCOM to the common-electrode signal line CL1 of the Tx circuit 210 is enabled. Output of the signal on the alternating-current-drive signal line TSVCOM to the common-electrode signal line CL1 is kept enabled, even after the signal on the clock signal line SDCK1 changes to low voltage. At timing t3, when the driver IC 250 changes the signal on the clock signal line SDCK2 to high voltage, output of the signal on the alternating-current-drive signal line TSVCOM to the common-electrode signal line CL2 is enabled, and this state is maintained.

Therefore, at timing t3, the driver IC 250 changes the signal on the clock signal line SDCK2 to high voltage, and then when the driver IC 250 outputs a string of pulses (alternating-current drive signal) to the alternating-current-drive signal line TSVCOM, these pulses are output to the common-electrode signal lines CL1 and CL2, i.e., two common-electrode signal lines, at the same time. That is, two common electrodes can be driven in a bundle.

At timing t4, when the driver IC 250 changes the signal on the clock signal line SDCK3 to high voltage, output of the signal on the alternating-current-drive signal line TSVCOM to the common-electrode signal line CL3 of the Tx circuit 210 is enabled. At timing t5, when the driver IC 250 changes the signal on the clock signal line SDCK4 to high voltage, output of the signal on the alternating-current-drive signal line TSVCOM to the common-electrode signal line CL4 of the Tx circuit 210 is enabled. Also, since the signal on the clock signal line SDCK4 that has been changed to high voltage is input to the reset terminal CRSTR of each of the switch circuits CSW1 and CSW2, the signal on the alternating-current-drive signal line TSVCOM, the output of which to the common-electrode signal lines CL1 and CL2 is enabled, is reset.

Therefore, at timing t5, the driver IC 250 changes the signal on the clock signal line SDCK4 to high voltage, and then when the driver IC 20 outputs a string of pulses (alternating-current drive signal) to the alternating-current-drive signal line TSVCOM, the pulses are output to the common-electrode signal lines CL3 and CL4, i.e., two common-electrode signal lines, at the same time. That is, it is possible that common electrodes are successively bundled and driven such that two common electrodes at a time are bundled for driving and the common electrodes to be bundled are shifted by two common electrodes at a time.

At timing t6, when the driver IC 250 changes the signal on the clock signal line SDCK1 to high voltage, output of the signal on the alternating-current-drive signal line TSVCOM to the common-electrode signal line CL5 of the Tx circuit 210 is enabled. At timing t7, when the driver IC 250 changes the signal on the clock signal line SDCK2 to high voltage, output of the signal on the alternating-current-drive signal line TSVCOM to the common-electrode signal line CL6 of the Tx circuit 210 is enabled. Also, since the signal on the clock signal line SDCK2 that has been changed to high voltage is input to the reset terminal CRSTR of each of the switch circuits CSW3 and CSW4, the signal on the alternating-current-drive signal line TSVCOM, output of which to the common-electrode signal lines CL3 and CL4 is enabled, is reset.

At timing t7, the driver IC 250 changes the signal on the clock signal line SDCK2 to high voltage, and then when the driver IC 250 outputs a string of pulses (alternating-current drive signal) to the alternating-current-drive signal line TSVCOM, these pulses are output to the common-electrode signal lines CL5 and CL6, i.e., two common-electrode signal lines, at the same time. That is, it is possible for common electrodes to be successively bundled and driven such that two common electrodes at a time are bundled and the common electrodes to be bundled are shifted by two common electrodes at a time.

Thereafter, as in the above drive method, the driver IC 250 successively selects clock signal lines SDCK in such a way as to select two clock signal lines SDCK at a time, and change signals passing through the selected signal lines SDCK to high voltage. Then, the driver IC 250 repeatedly outputs a string of pulses (alternating-current drive signal) to the alternating-current-drive signal line TSVCOM in the above manner. By virtue of this drive method, it is possible to achieve a drive method (2-bundle, 2-shift drive) in which common electrodes are successively bundled and driven such that two common electrodes at a time are bundled for driving and the common electrodes to be bundled are shifted by two common electrodes at a time.

It should be noted that either the above 3-bundle, 2-shift drive or 2-bundle, 2-shift drive can be achieved by changing the output of a control signal from the driver IC 250. Therefore, any of the two drive methods may be applied to the driver IC 250, or the driver IC 250 may be set in advance compliant with both the above two drive methods, and perform driving in accordance with one of the drive methods which is automatically or manually selected as an appropriate one in accordance with a touch-drive condition.

In the embodiment explained above, four-phase clock signals are used as transfer clock signals for the Tx circuits. Furthermore, the shift register module of each of the Tx circuits has a circuit structure in which it is reset by a transfer clock signal, not a feedback system using an output of a subsequent shift register module. In addition, in order that a number of Tx electrodes be selected in a bundle, a circuit structure for holding the voltage of an internal node is provided in a switch portion of the Tx circuit, and in the circuit structure, the switch module is reset using four-phase clock signals. As a result, a plurality of Tx electrodes can be bundled and driven, and the number of Tx electrodes to be bundled can be selected by control effected by the driver IC. Thereby, commonality of array substrates can be achieved, and the manufacturing cost can be reduced.

Furthermore, in the embodiment, in a display device having a touch detection function, part of the structure of a Tx circuit and an output signal from a driver IC are changed, thereby achieving bundled drive. Since the other part of the display device does not need to be changed, it is possible to easily achieve drive in which a plurality of common electrodes are successively bundled and driven such that the common electrodes to be bundled for driving are shifted by two common electrodes at a time.

It should be noted that the embodiment is not limited to the panel structure described with respect to the embodiment.

The panel according to the embodiment is explained above by referring to by way of example a panel employing a liquid crystal having a lateral-electric-field mode such as an in-plane switching (IPS) mode or a fringe-field switching (FFS) mode. The embodiment, however, is not limited to this, and can also be applied to a panel employing a liquid crystal having a vertical-electric-field mode such as a twisted nematic (TN) mode or optically compensated bend (OCB) mode.

Furthermore, with respect to the embodiment, the display device having a touch detection function is explained above by referring to by way of example a so-called in-cell display device. However, the embodiment can also be applied to an on-cell display device having a display surface on which a touch panel is formed.

All display devices which a person with ordinary skill in the art can put to practical use by making an arbitrary design change based on the display device described above with respect to the embodiment fall within the scope of the present invention, as long as they have the subject matter of the invention.

A person with ordinary skill in the art would conceive various changes and modifications of the embodiment within the scope of the technical concept of the invention, and naturally, such changes and modifications are encompassed by the scope of the invention. For example, if a person with ordinary skill in the art adds/deletes/alters a structural element or design to/from/in the above embodiment, or adds/deletes/alters a step or a condition to/from/in the embodiment, as long as they falls within the scope and spirit of the invention, such addition, deletion, and altercation are encompassed by the scope of the invention.

Furthermore, regarding the embodiment, any advantage and effect those will be obvious from the description of the specification or arbitrarily conceived by a person with ordinary skill in the art are naturally considered achievable by the invention.

Various inventions can be achieved by any suitable combination of a plurality of structural elements disclosed in the embodiment. For example, some structural elements may be deleted from the whole structural elements indicated in the embodiment. Furthermore, some structural elements of one embodiment may be combined with other structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a plurality of common electrodes extending in a first direction and arranged in parallel with each other;
   a plurality of detection electrodes extending in a second direction crossing the first direction and arranged in parallel with each other;
   a common-electrode drive circuit including a plurality of shift registers connected in series to each other and a plurality of switch circuits electrically connected to the shift registers, respectively; and
   a driver which outputs four-phase clock signals and a touch-drive signal to control the common-electrode drive circuit,
   wherein
   each of the shift registers is configured to transfer a shift signal, and a reset operation of the each shift register is controlled by predetermined two of the four-phase clock signals,
   each of the switch circuits connects a signal line from the driver to a common electrode or electrodes of an associated block based on a shift signal output from an associated shift register for outputting the touch-drive signal,
   the each switch circuit causes the touch-drive signal from the driver to be supplied to the common electrode or electrodes of the block during a period from time at which the shift signal is output from the associated shift register to time at which a predetermined one of the four-phase clock signals is input, each of the switch circuits supplies the touch-drive signal to the signal line when the touch-drive signal is input from the driver, and disconnects the signal line from the common electrode or electrodes of the block when the predetermined one of the four-phase clock signals is input from the driver,
the driver successively and repeatedly outputs first to fourth clock signals that are the four-phase clock signals, and
where a clock signal for controlling a transfer operation of the shift register is an Nth clock signal, a clock signal for controlling the reset operation of the shift register is an Mth clock signal, and a clock signal to be input to the switch circuit connected to the shift register is a Kth clock signal, N, M and K are integers of 4 or less, and the following relationships are satisfied:

$(N+2) \equiv M \bmod 4$ when $M \equiv 1 \bmod 4$ or $M \equiv 2 \bmod 4$, K=4, and when $M \equiv 3 \bmod 4$ or $M \equiv 0 \bmod 4$, K=2.

2. The display device according to claim 1, wherein the driver repeatedly performs an operation for outputting the touch-drive signal to the common-electrode drive circuit after successively outputting the first to third clock signals to the common-electrode drive circuit, and then outputting the touch-drive signal to the common-electrode drive circuit after successively outputting two clock signals from the fourth clock signal to the common-electrode drive circuit.

3. The display device according to claim 1, wherein the driver repeatedly performs an operation for outputting the touch-drive signal to the common electrode circuit after successively outputting two clock signals from the first clock signal to the common-electrode circuit.

4. The display device according to claim 1, wherein the common electrodes are used as electrodes for a touch-drive operation and electrodes for an image display operation, and
the each switch circuit applies a common voltage for the image display operation to the common electrode or electrodes of the block, when the image display operation is performed, and supplies the touch-drive signal to the common electrode or electrodes of the block when a touch detection operation is performed.

5. The display device according to claim 4, wherein the driver further outputs to the common-electrode drive circuit a signal for indicating whether the image display operation is performed or the touch-drive operation is performed and the common voltage.

6. A display device comprising:
common electrodes doubling as electrodes for an image display operation and electrodes for a touch detection operation; and
a drive circuit which drives the common electrodes, wherein
the common electrodes include an nth common electrode (n≥1), an n+1th common electrode and an n+2th common electrode,
the drive circuit includes: switch circuits which output signals for the touch detection signal or signals for the image display operation to the common electrodes in a switchable manner; and shift register circuits which output control signals to the switch circuits,
the switch circuits include an nth switch circuit, an n+1th switch circuit and an n+2th switch circuit,
the nth switch circuit, the n+1th switch circuit and the n+2th switch circuit hold control signals from the shift register circuits as an nth switch signal, an n+1th switch signal and an n+2th switch signal, respectively,
the nth switch circuit, the n+1th switch circuit and the n+2th switch circuit are electrically connected to the nth common electrode, the n+1th common electrode and the n+2th common electrode, respectively, and
in a period in which the nth switch circuit and the n+1th switch circuit simultaneously hold the nth switch signal and the n+1th switch signal, respectively, the n+2th switch circuit starts to hold the n+2th switch signal,
clock signals each of which comprises a first voltage and a second voltage are input to the shift register circuits,
the clock signals include a first clock signal, a second clock signal, a third clock signal and a fourth clock signal,
the first clock signal, the second clock signal, the third clock signal and the fourth clock signal are transformed into first voltages in this order, and
the nth switch circuit, to which the first voltage obtained by transforming the first clock signal is input as a control signal, and the n+1th switch circuit to which the first voltage obtained by transforming the second clock signal is input as another control signal, stop holding of the nth switch signal and holding of the n+1th switch signal, respectively, upon reception of the first voltage from the fourth clock signal.

7. The display device according to claim 6, wherein the switch circuits include: first output transistors which output signals for the touch detection operation; and second output transistors which output signals for the image display operation.

8. The display device according to claim 7, wherein
a touch period signal indicating a touch detection period is input to a switch circuit, and
the switch circuit supplies the touch period signal to the first output transistor thereof to turn on the first output transistor, in accordance with the control signal from an associated shift register.

9. The display device according to claim 7, wherein in a period in which the nth switch circuit and the n+1th switch circuit simultaneously hold the nth switch signal and the n+1th switch signal, respectively, the first output transistors of the nth switch circuit and the n+1th switch circuit are turned on.

10. The display device according to claim 7, wherein after the n+2th switch circuit holds the n+1th switch signal, the first output transistors of the n+1th switch circuit and the n+2th switch circuit are turned on.

11. The display device according to claim 7, wherein
a display period signal indicating a display period is input to a switch circuit, and
the switch circuit supplies the display period signal to the second output transistor thereof to turn on the second output transistor, in accordance with a control signal from an associated shift register.

12. A display device comprising:
a plurality of common electrodes doubling as electrodes for an image display operation and electrodes for a touch detection operation; and
a plurality of drive circuits for driving the common electrodes,
wherein
the drive circuits include: switch circuits each of which outputs a signal for the touch detection operation or a signal for the image display operation to the common electrodes in a switchable manner; and shift register circuits each of which outputs a control signal to an associated one of the switch circuits, the switch circuits include hold circuits each of which holds the control signal from an associated one of the shift register circuits as a switch signal, clock signals each of which comprises a first voltage and a second voltage are input to the shift register circuits, the clock signals include a first clock signal, a second clock signal, a third clock signal and a fourth clock signal, the first clock signal, the second clock signal, the third clock signal and the fourth clock signal are transformed into first voltages in this order, the common electrodes include a first common electrode and a second common electrode which are arranged adjacent to each other, the switch circuits include a first switch circuit which outputs a signal for the touch detection operation to the first common electrode, upon reception of the first clock signal, which is input as a control signal, the switch circuits include a second switch circuit which outputs a signal for the touch detection operation to the second common electrode upon reception of the second clock signal, which is input as another control signal, and hold circuits of the first switch circuit and the second switch circuit stop holding of respective switch signals with the first voltage of the fourth clock signal.

13. The display device according to claim 12, wherein the switch circuits include: first output transistors each of which outputs a signal for the touch detection operation; and second output transistors each of which outputs a signal for the image display operation.

14. The display device according to claim 13, wherein
a touch period signal indicating a touch detection period is input to a switch circuit, and
the switch circuit supplies the touch period signal to the first output transistor thereof to turn on the first output transistor, in accordance with the switch signal.

15. The display device according to claim 14, wherein in a period in which the first switch circuit and the second switch circuit simultaneously hold the switch signals, first output transistors of the first switch circuit and the second switch circuit are turned on by the touch period signal.

16. The display device according to claim 14, wherein
a third common electrode is located adjacent to the second common electrode,
a third switch circuit outputs the signal for the touch detection operation to the third common electrode, and
after the third switch circuit holds a switch signal, first output transistors of the first to third switch circuits are turned on.

17. The display device according to claim 13, wherein
a display period signal indicating a display period is input to a switch circuit, and
the switch circuit supplies the display period signal to the second output transistor thereof to turn on the second output transistor, in accordance with the switch signal.

* * * * *